United States Patent
Ueki et al.

(10) Patent No.: US 8,947,055 B2
(45) Date of Patent: Feb. 3, 2015

(54) BATTERY CONTROL SYSTEM

(75) Inventors: Tomoyoshi Ueki, Toyota (JP); Yukihiro Okada, Shijonawate (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 122 days.

(21) Appl. No.: 13/579,304

(22) PCT Filed: Sep. 27, 2010

(86) PCT No.: PCT/JP2010/066684
§ 371 (c)(1),
(2), (4) Date: Aug. 16, 2012

(87) PCT Pub. No.: WO2012/042585
PCT Pub. Date: Apr. 5, 2012

(65) Prior Publication Data
US 2013/0181684 A1   Jul. 18, 2013

(51) Int. Cl.
*H02J 7/04* (2006.01)
*H02J 7/16* (2006.01)
(Continued)

(52) U.S. Cl.
CPC ............. *H02J 7/0052* (2013.01); *H01M 10/42* (2013.01); *H01M 10/44* (2013.01); *H01M 10/48* (2013.01);
(Continued)

(58) Field of Classification Search
CPC ............. H02J 7/04; H02J 7/16; H02J 7/0052; H02J 7/0057; Y02T 10/7088; Y02T 10/7011; Y02T 10/7005; Y02T 90/14; Y02T 90/128; B60L 11/185; B60L 11/1861; B60L 2240/545; B60L 2240/549; B60L 2240/547; B60L 2240/54; B60L 2240/7044; B60L 2240/705; H01M 10/42; H01M 10/44; H01M 10/48

USPC ......... 320/162, 149, 153, 107, 57; 429/50, 61
See application file for complete search history.

(56) References Cited

U.S. PATENT DOCUMENTS

2005/0269870 A1\* 12/2005 Ohashi et al. ................... 303/20
2008/0197813 A1   8/2008 Asakura et al.
(Continued)

FOREIGN PATENT DOCUMENTS

| JP | 9-19073 | 1/1997 |
| JP | 9-84277 | 3/1997 |

(Continued)

OTHER PUBLICATIONS

International Search Report in International Application No. PCT/JP2010/066684; Mailing Date: Apr. 5, 2011.

*Primary Examiner* — Phallaka Kik
(74) *Attorney, Agent, or Firm* — Finnegan, Henderson, Farabow, Garrett & Dunner, LLP

(57) ABSTRACT

A battery control system includes a lithium ion secondary battery and a control device and further includes a voltage storage unit, a resistance storage unit, a current storage unit, a difference obtaining unit for obtaining a difference resistance $\Delta R(T_{ja})$ between a normal internal resistance $R_j(T_{ja})$ at a predetermined battery temperature $T_{ja}$ in a normal temperature range $AT_j$ and an initial internal resistance $R_0(T_{ja})$ at the predetermined battery temperature, and a maximum voltage calculation unit for giving a maximum inter-terminal voltage $V_m(T)$, when at least a battery temperature T is within a low-temperature range $AT_l$, as a value obtained by adding a product of the difference resistance $\Delta R(T_{ja})$ and the allowable charging current $I_m(T)$ to the initial maximum inter-terminal voltage $V_{m0}(T)$.

20 Claims, 9 Drawing Sheets

(51) Int. Cl.
*B60L 11/00* (2006.01)
*H01M 10/44* (2006.01)
*H01M 10/48* (2006.01)
*H02J 7/00* (2006.01)
*H01M 10/42* (2006.01)
*B60L 11/18* (2006.01)

(52) U.S. Cl.
CPC ........... *B60L 11/185* (2013.01); *B60L 11/1861* (2013.01); *H02J 7/04* (2013.01); *H02J 7/16* (2013.01); *H02J 7/0057* (2013.01); *B60L 2240/545* (2013.01); *B60L 2240/549* (2013.01); *Y02T 10/7088* (2013.01); *Y02T 10/7011* (2013.01); *Y02T 90/14* (2013.01); *Y02T 90/128* (2013.01); *Y02T 10/7005* (2013.01); *B60L 2240/547* (2013.01); *B60L 2240/54* (2013.01); *Y02T 10/7044* (2013.01); *Y02T 10/705* (2013.01)
USPC ........... 320/162; 320/149; 320/153; 320/107; 320/157; 429/50; 429/61

(56) References Cited

U.S. PATENT DOCUMENTS

2009/0130538 A1* 5/2009 Kaita et al. ............... 429/50
2011/0299564 A1* 12/2011 Leutheuser et al. .......... 374/134

FOREIGN PATENT DOCUMENTS

| | | |
|---|---|---|
| JP | 9-149556 | 6/1997 |
| JP | 9-233732 | 9/1997 |
| JP | 2000-270491 | 9/2000 |
| JP | 2002-142379 | 5/2002 |
| JP | 2007-221868 | 8/2007 |
| JP | 2008-24124 | 2/2008 |
| JP | 2008-136330 | 6/2008 |
| JP | 2008-192607 | 8/2008 |
| JP | 2008-204800 | 9/2008 |
| JP | 2008-204801 | 9/2008 |
| JP | 2010-63279 | 3/2010 |

* cited by examiner

BATTERY CONTROL SYSTEM

CROSS-REFERENCE TO RELATED APPLICATIONS

This application is a national phase application of International Application No. PCT/JP2010/066684, filed Sep. 27, 2010, the content of which is incorporated herein by reference.

TECHNICAL FIELD

The present invention relates to a battery control system provided with a lithium-ion secondary battery having a positive electrode plate and a negative electrode plate, and a control device for controlling charge of the lithium-ion secondary battery from a power supply.

BACKGROUND ART

In recent years, chargeable and dischargeable lithium-ion secondary batteries (hereinafter, simply referred to as secondary batteries) are used for drive power source of vehicles, such as hybrid cars and electric cars. When such secondary batteries are quickly charged or regenerative current is used for charge in vehicles mounted with secondary batteries, such as hybrid cars and electric cars, a large charging current of 5 C or 10 C, for example, is occasionally applied.

In a case where internal resistance of a secondary battery becomes high due to aging in the secondary battery, even if the same level of the charging currents are applied to the secondary battery, an inter-terminal voltage becomes higher than that at an initial stage (before deterioration, before the increase in the internal resistance) due to the increase in the internal resistance of the secondary battery. On the contrary, in a case where a maximum inter-terminal voltage of the secondary battery is set to a constant value to charge the battery, the larger the value of the internal resistance of the secondary battery is, the higher the inter-terminal voltage becomes. The inter-terminal voltage reaches the maximum value more quickly, and thus the charging cannot be further carried out. For this reason, in the secondary battery whose internal resistance increases, an electric quantity (charge quantity) by which the secondary battery can be charged is reduced more than a time point where the internal resistance is low.

On the contrary, Patent Document 1 discloses a method for charging a lithium-ion secondary battery comprising a step of detecting an internal resistance on charging a lithium-ion secondary battery, and a step of finally charging the secondary battery by performing constant-current charge with a final charging current and performing constant-voltage charge with a final charging voltage. In this technique, the final charging voltage at the final charging step is set to a value obtained by adding a product of the internal resistance and the final charging current of the secondary battery to the set voltage of the secondary battery. For this reason, this method enables a secondary battery to be charged up to the set voltage regardless of the level of the internal resistance. Therefore, according to this technique of Patent Document 1, a secondary battery that is deteriorated and has increased internal resistance can also be sufficiently charged.

RELATED ART DOCUMENTS

Patent Documents

Patent Document 1: JP2002-142379A

DISCLOSURE OF THE INVENTION

Problems to be Solved by the Invention

However, Patent Document 1 discloses the method for charging a secondary battery using the constant-voltage charge in which a charging current is gradually lower near full charge, and thus cannot be applied to a case, such as the quick charge or the charge with regenerative current, where a secondary battery is charged by a high electric current.

Further, the internal resistance of a secondary battery includes DC resistance of a secondary battery (resistance due to an electrolytic solution in a separator, resistance to conduction of a current collector or the like), diffusion resistance of ion in a positive electrode plate, diffusion resistance of ion in a negative electrode plate, reaction resistance of the positive electrode plate, and reaction resistance of the negative electrode plate. For this reason, at the time of charging, polarization occurs in the negative electrode plate due to the reaction resistance of the negative electrode plate itself. The larger a product of the reaction resistance of the negative electrode plate and the charging current is, the larger this polarization becomes. Therefore, when large polarization is occurred in the negative electrode plate by application of a high electric current at the time of charging, an electric potential of the negative electrode plate becomes lower than that of metallic lithium, and the metallic lithium might be deposited on the negative electrode plate.

Further, in some of negative electrode plates using a negative active material such as graphite, normal reaction resistance occurred in a negative electrode plate within a normal temperature range (20 to 45° C.) is sufficiently lower than DC resistance, but low-temperature reaction resistance in a low temperature range (−30 to 0° C.) becomes high, and higher than the DC resistance.

Therefore, when secondary batteries using the negative electrode plates having such characteristics are charged in the low-temperature range, in order to increase a quantity of electricity for charge, it is considered that the internal resistance in the low-temperature range is used like Patent Document 1 and a product of this and an allowable charging current (for example, 5 C and 10 C) is added to a set voltage so that charge is performed with the added value as a maximum inter-terminal voltage. However, large polarization is occurred in the negative electrode plate because the reaction resistance of the negative electrode plate is high in the low-temperature range. Thus, metallic lithium might be easily deposited. For this reason, it is particularly difficult to change the maximum inter-terminal voltage into a high value and increase an amount of charge.

The present invention is devised in view of the above problem, and provides a battery control system capable of suitably charging a secondary battery using a negative electrode plate that has a characteristic such that reaction resistance increases in a low-temperature range, the system charging the battery up to a higher inter-terminal voltage while deposition of metallic lithium on the negative electrode plate of the secondary battery is being suppressed even when a battery temperature is in the low-temperature range and the charge is performed by a high electric current such as a case of quick charge and charge by regenerative current in vehicles.

Means of Solving the Problems

One aspect of the present invention provides a battery control system including a lithium-ion secondary battery (hereinafter, simply a secondary battery) having a positive electrode plate and a negative electrode plate, and a control device for setting an allowable maximum inter-terminal voltage and an allowable charging current at the time of charging of the secondary battery and controlling the charging from a power supply to the secondary battery, wherein when a normal temperature range $AT_j$ of a battery temperature T is set to 20 to 45° C. and a low-temperature range $AT_l$ of a battery temperature T is set to −30 to 0° C., the negative electrode plate has a characteristic such that when characteristics of the negative electrode plate are compared in cases where the battery temperature T is within the normal temperature range $AT_j$ and within the low-temperature range $AT_l$, reaction resistance $R_r(T)$ caused in the negative electrode plate is higher in the low-temperature range $AT_l$, and a ratio of the reaction resistance $R_r(T)$ of the negative electrode plate in internal resistance $R(T)$ of the secondary battery is larger in the low-temperature range $AT_l$, wherein the battery control system includes: a voltage storage unit for storing an initial maximum inter-terminal voltage $V_{m0}(T)$ allowed at an early use of the secondary battery in the maximum inter-terminal voltage $V_m(T)$ for each battery temperature T; a resistance storage unit for storing initial internal resistance $R_0(T)$ caused at the early use of the secondary battery at least at a predetermined battery temperature $T_{ja}$ within the normal temperature range $AT_j$; an electric current storage unit for storing the allowable charging current $I_m(T)$ for each battery temperature T; a difference obtaining unit for obtaining difference resistance $\Delta R(T_{ja})$ as a difference between normal internal resistance $R_j(T_{ja})$ at temperature $T_j$ within the normal temperature range $At_j$ in the internal resistance of the secondary battery at timing when the battery temperature T of the secondary battery becomes the predetermined battery temperature $T_{ja}$ and the corresponding initial internal resistance $R_0(T_{ja})$ at the predetermined battery temperature $T_{ja}$ stored in the resistance storage unit; and a maximum voltage calculating unit for, at least when the battery temperature T is within the low-temperature range $AT_l$, setting the maximum inter-terminal voltage $V_m(T)$ corresponding to the battery temperature T to a value obtained by adding a product of the difference resistance $\Delta R(T_{ja})$ and the allowable charging current $I_m(T)$ stored in the electric current storage unit to the initial maximum inter-terminal voltage $V_{m0}(T)$ stored in the voltage storage unit.

The battery control system includes the difference obtaining unit for obtaining the difference resistance $\Delta R(T_{ja})$ between the initial internal resistance $R_0(T_{ja})$ and the normal internal resistance $R_j(T_{ja})$ of the secondary battery obtained at timing when the predetermined battery temperature $T_{ja}$ within the normal temperature range $AT_j$ is reached. Further, the maximum voltage calculating unit gives the maximum inter-terminal voltage $V_m(T)$ at least within the low-temperature range $AT_l$ as the value obtained by adding the product of the difference resistance $\Delta R(T_{ja})$ and the allowable charging current $I_m(T)$ to the initial maximum inter-terminal voltage $V_{m0}(T)$.

Therefore, the battery control system can further suppress a reduction in a charging amount of the secondary battery caused by an increase in the internal resistance due to deterioration and the like when the battery temperature T is at least within the low-temperature range $AT_l$, in comparison with a case where the charge of the secondary battery is controlled with the maximum inter-terminal voltage $V_m(T)$ being maintained at the initial maximum inter-terminal voltage $V_{m0}(T)$ as a constant value.

Further, like Patent Document 1, not the product of the internal resistance and an electric current but a product of the difference resistance $\Delta R(T)$ as an increase in the internal resistance and the allowable charging current $I_m(T)$ is obtained. Since this product is added to the initial maximum inter-terminal voltage $V_{m0}(T)$, a suitable maximum inter-terminal voltage $V_m(T)$ corresponding to the increase in the internal resistance can be obtained.

Further, although the battery temperature T is within the low-temperature range $AT_l$, a value of the difference resistance $\Delta R(T_{ja})$ at the predetermined battery temperature $T_{ja}$ within the normal temperature range $AT_j$ is used as the difference resistance $\Delta R(T)$. The reason for this is as follows.

In this battery control system, the secondary battery includes the negative electrode plate having the above-described characteristics, namely, the characteristics that a ratio of the reaction resistance $R_r(T)$ occurred in the negative electrode plate at the battery temperature T and the reaction resistance $R_r(T)$ of the secondary battery in the internal resistance $R(T)$ is larger in the low-temperature range $AT_l$ than in the normal temperature range $AT_j$.

When the internal resistance $R(T)$ of the secondary battery increases due to aging variation or the like, the internal resistance $R(T)$ generally increases by the same ratio even in any temperature range. Further, also respective resistance components in the internal resistance $R(T)$ such as the reaction resistance and DC resistance generally increase by the same ratio (for example, similarly increases by 30%). Therefore, when absolute values are compared, the chronologic increase in low-temperature reaction resistance $R_r(T_l)$ at temperature $T_l$ within the low-temperature range $AT_l$ is larger than an increase in normal reaction resistance $R_{rj}(T_j)$ at temperature $T_j$ within the normal temperature range $AT_j$. That is to say, as to the difference resistance $\Delta R(T)$ representing the increase in the internal resistance $R(T)$, the difference resistance $\Delta R(T_l)$ at the temperature $T_l$ within the low-temperature range $AT_l$ obtains a value larger than the difference resistance $\Delta R(T_j)$ at the temperature $T_j$ within the normal temperature range $AT_j$.

If the battery temperature T is temperature $T_l$ within the low-temperature range $AT_l$, differently from the battery control system, and the maximum voltage calculating unit adds a product of the difference resistance $\Delta R(T_l)$ at the temperature $T_l$ within the low-temperature range $AT_l$ and the allowable charging current $I_m(T_l)$ to the initial maximum inter-terminal voltage $V_{m0}(T_l)$, the difference resistance $\Delta R(T_l)$ at the temperature $T_l$ is large as an absolute value as described above. For this reason, the maximum inter-terminal voltage $V_m(T_l)$ might obtain a too large value. As a result, the polarization on the negative electrode plate becomes too large, and thus the deposition of metallic lithium might occur. When the battery temperature T is within the low-temperature range $AT_l (T=T_l)$ in such a manner, it is occasionally not preferable that the difference resistance $\Delta R(T_l)$ at the temperature $T_l$ within the low-temperature range $AT_l$ is directly adopted, and the maximum inter-terminal voltage $V_m(T_l)$ is increased.

Therefore, according to the battery control system, when the battery temperature T is the temperature $T_l$ within the low-temperature range $AT_l$ in the maximum voltage calculating unit, instead of the difference resistance $\Delta R(T_l)$ corresponding to the battery temperature T (the temperature $T_l$ within the low-temperature range $AT_l$), the difference resistance $\Delta R(T_{ja})$ at the predetermined battery temperature $T_{ja}$ within the normal temperature range $AT_j$ which is a comparatively smaller value is used, and a product of this difference resistance $\Delta R(T_{ja})$ and the allowable charging current $I_m(T_j)$ is added to the initial maximum inter-terminal voltage $V_{m0}(T_j)$ to obtain the maximum inter-terminal voltage $V_m(T_j)$. For this reason, even in the case where the maximum inter-terminal voltage $V_m(T_j)$ is set to a value larger than the initial maximum inter-terminal voltage $V_{m0}(T_j)$, and even when the internal resistance of the secondary battery increases due to aging variation, the reduction in the charging amount of the secondary battery can be suppressed, whereas the maximum inter-terminal voltage $V_m(T_j)$ does not become too large. As a result, the deposition of metallic lithium on the negative electrode plate might not occur.

In the secondary battery of the above battery control system using the negative electrode plate having a characteristic such that the reaction resistance $R_r(T)$ (low-temperature reaction resistance $R_{rl}(T)$) in the low-temperature range $AT_l$ is increased more than a case of the normal temperature range $AT_j$, even when the internal resistance increases with age and the battery temperature T is within the low-temperature range $AT_l$ and charge is carried out by a large electric current in such a case as quick charge and charge by regenerative current in vehicles etc., the deposition of metallic lithium on the negative electrode plate of the secondary battery is suppressed, and at the same time the secondary battery can be charged suitably to a higher inter-terminal voltage.

Examples of the power supply include a DC power supply apparatus, a battery charger, an engine and a motor capable of generating power in a case where the secondary battery is installed in a vehicle.

When characteristics of the negative electrode plate are compared between cases where the battery temperature T is within the normal temperature range $AT_j$ and within the low-temperature range $AT_l$, the reaction resistance $R_r(T)$ occurred in the negative electrode plate is larger in the low-temperature range $AT_l$, and a ratio of the reaction resistance $R_r(T)$ of the negative electrode plate in the internal resistance $R(T)$ of the secondary battery is higher in the low-temperature range $AT_l$. That is to say, as to the reaction resistance $R_r(T)$ occurred in the negative electrode plate composing a part of the internal resistance $R(T)$ of the secondary battery, low-temperature reaction resistance $R_{rl}(T_l)$ at the temperature $T_l$ within the low-temperature range $AT_l$ is higher than normal reaction resistance $R_{rj}(T_j)$ at the temperature $T_j$ within the normal temperature range $AT_j$. Further, in comparison with a ratio $R_{rj}(T_j)/R_j(T_j)$ of the normal reaction resistance $R_{rj}(T_j)$ in the normal internal resistance $R_j(T_j)$ as the internal resistance of the secondary battery at the temperature $T_j$ within the normal temperature range $AT_j$, a ratio $R_{rl}(T_l)/R_l(T_l)$ of low-temperature reaction resistance $R_{rl}(T_l)$ in low-temperature internal resistance $R_l(T_l)$ as the internal resistance of the secondary battery at the temperature $T_l$ within the low-temperature range $AT_l$ is larger. Examples of such a negative electrode plate include negative electrode plates containing natural graphite and artificial graphite as a negative active material.

Further, the resistance storage unit may store at least the initial internal resistance $R_0(T)$ at the predetermined battery temperature $T_{ja}$ within the normal temperature range $AT_j$. Therefore, the entire normal temperature range $AT_j$ or the entire range including the low-temperature range $AT_l$ are stored for each battery temperature T therein.

Further, in the battery control system, preferably, the negative electrode plate has a characteristic such that, as to the reaction resistance $R_r(T)$, the low-temperature reaction resistance $R_{rl}(T_l)$ at the temperature $T_l$ within the low-temperature range $AT_l$ obtains a value that is 7 or more times as large as the normal reaction resistance $R_{rl}(T_l)$ at the temperature $T_j$ within the normal temperature range $AT_j$, a ratio $R_{rj}(T_j)/R_j(T_j)$ of the normal reaction resistance $R_{rj}(T_j)$ in the normal internal resistance $R_j(T_j)$ that is the internal resistance $R(T)$ at the temperature $T_j$ is 10% or less, and a ratio $R_{rl}(T_l)/R_l(T_l)$ of the low-temperature reaction resistance $R_{rl}(T_l)$ in the low-temperature internal resistance $R_l(T_l)$ that is the internal resistance $R(T)$ at the temperature $T_l$ is 20% or more.

In the above battery control system, since the negative electrode plate has the above characteristic, the low-temperature reaction resistance $R_{rl}(T_l)$ is securely larger than the normal reaction resistance $R_{rj}(T_j)$, and the ratio $R_{rj}(T_j)/R_j(T_j)$ is securely larger than the ratio $R_{rl}(T_l)R_l(T_l)$. For this reason, since the charge of the secondary battery using such a negative electrode plate is controlled, the maximum voltage calculating unit uses the difference resistance $\Delta R(T_{ja})$ at the predetermined battery temperature $T_{ja}$ within the normal temperature range $AT_j$ so as to be capable of obtaining the maximum inter-terminal voltage $V_m(T)$ from which a contribution of an increase in the reaction resistance particularly in the negative electrode plate is securely removed. Therefore, at least when the battery temperature T is within the low-temperature range $AT_l$, a suitable maximum inter-terminal voltage $V_m(T)$ is obtained to charge the secondary battery.

Further, in any one of the above battery control systems, preferably, the battery temperature T is higher than the low-temperature range $AT_l$, the maximum voltage calculating unit sets the initial maximum inter-terminal voltage $V_{m0}(T)$ to be a value of the maximum inter-terminal voltage $V_m(T)$.

As described above, in the negative electrode plate of the secondary battery to be used in the battery control system, the ratio $R_{rl}(T_l)/R_l(T_l)$ of the low-temperature reaction resistance $R_{rl}(T_l)$ in the low-temperature internal resistance $R_l(T_l)$ is larger in comparison with the ratio $R_{rj}(T_j)/R_j(T_j)$ of the normal reaction resistance $R_{rj}(T_j)$ in the normal internal resistance $R_j(T_j)$. For this reason, when the secondary battery is charged at the battery temperature T higher than the low-temperature range $AT_l$, since a rise in the internal resistance of the secondary battery is smaller than the case where the battery is charged at a battery temperature $T_l$ within the low-temperature range $AT_l$, even if the initial maximum inter-terminal voltage $V_{m0}(T)$ is used as the value of the maximum inter-terminal voltage $V_m(T)$, a reduction in the battery capacity due to the rise over time in the internal resistance is considered to be slight.

Therefore, in the battery control system, when the battery temperature T is higher than the low-temperature range $AT_l$, the initial maximum inter-terminal voltage $V_{m0}(T)$ is set to be the value of the maximum inter-terminal voltage $V_m(T)$. As a result, when the battery temperature T is higher than the low-temperature range $AT_l$, the maximum inter-terminal voltage $V_m(T)$ does not have to be changed, and thus the system can be more simplified.

Further, any one of the above battery control systems may include a resistance obtaining unit for obtaining the normal internal resistance $R_j(T_{ja})$ of the secondary battery when the battery temperature T of the secondary battery is the predetermined battery temperature $T_{ja}$.

Since the battery control system has the resistance obtaining unit, the battery control system itself can obtain the normal internal resistance $R_j(T_{ja})$ of the secondary battery and can autonomously change the maximum inter-terminal voltage $V_m(T)$.

Further, the above battery control system may include a charging state detecting unit for detecting a charging state of the secondary battery; an open inter-terminal voltage storage unit for storing an open inter-terminal voltage at each charging state of the secondary battery in advance; and an open inter-terminal voltage obtaining unit for obtaining the open inter-terminal voltage based on the charging states detected by the charging state detecting unit, wherein the resistance obtaining unit is a means for, when the same level of charging currents are detected until a second time after a predetermined time passes from a first time just after an operation of the secondary battery is changed from discharging to charging in a charging period of the secondary battery, obtaining the normal internal resistance $R_j(T_{ja})$ by using a difference between the open inter-terminal voltage corresponding to the charging state of the secondary battery at the first time and the inter-terminal voltage of the secondary battery at the second time, and a current value of the charging current, and the predetermined time is 1.0 second or less.

The battery control system has the charging state detecting unit, the open inter-terminal voltage storage unit and the open inter-terminal voltage obtaining unit. In the resistance obtaining unit, when the same level of the charging currents are detected from the first time to the second time, the normal internal resistance $R_j(T_{ja})$ is obtained by using a difference between the open inter-terminal voltage of the secondary battery and the inter-terminal voltage of the secondary battery at the second time and the current values of the charging currents. That is to say, in the above battery control system, the normal internal resistance $R_j(T_{ja})$ of the secondary battery can be obtained based on a DC resistance measuring (DC-IR) method.

When the internal resistance of the secondary battery is obtained based on the DC-IR method, if the time period taken for measuring the inter-terminal voltage of the secondary battery in a state that the charging current is applied (hereinafter, a measuring period) after the start of charging becomes long, the internal resistance to be obtained becomes high. Immediately after the charging current is started to be applied to the secondary battery, the reaction resistance of the positive electrode plate, the reaction resistance of the negative electrode plate and the DC resistance of the secondary battery are mainly occurred as the internal resistance, but thereafter diffusion resistance of ions in the positive electrode plate and the negative electrode plate gradually appear. For this reason, when the measuring period is long, besides the reaction resistance of the positive electrode plate, the reaction resistance of the negative electrode plate and the DC resistance, a component of the diffusion resistance is added to the internal resistance obtained based on the DC-IR method so that the internal resistance has a comparatively larger value. As a result, the difference resistance $\Delta R(T)$ obtains a value to which the increase in the diffusion resistance is added, and the maximum inter-terminal voltage of the secondary battery obtained by a maximum voltage obtaining unit also has a large value. For this reason, when the secondary battery is charged, the polarization of the negative electrode plate becomes too large, and thus metallic lithium might be deposited on the negative electrode plate.

On the contrary, according to the studies by the inventors, it is found that when the internal resistance of the secondary battery is measured by the DC-IR method, if the measuring period is set to 1.0 second or less, a ratio of the diffusion resistance in the internal resistance can be sufficiently low.

In the above battery control system, since the predetermined time from the first time to the second time corresponding to the measuring time is 1.0 second or less, the resistance obtaining unit can obtain the normal internal resistance $R_j(T_{ja})$ in which the ratio of the diffusion resistance is sufficiently low. Therefore, when the charge is carried out by a large electric current, the deposition of metallic lithium on the negative electrode plate of the secondary battery is suppressed, and simultaneously the secondary battery can be charged suitably to a higher inter-terminal voltage.

The DC resistance measuring (DC-IR) method is a method for calculating the internal resistance of the secondary battery by using a change amount of the inter-terminal voltage of the secondary battery occurred when a constant charging current is applied to the secondary battery (concretely, the change amount between the open inter-terminal voltage immediately before the charging current is started to be applied and the inter-terminal voltage after the predetermined time passes from the start of the charge), and the current value of the charging current.

Further, it is preferable that the above battery control system has an electric current detecting unit for detecting the current value of the charging current flowing in the secondary battery at a predetermined cycle, and is configured so that when a plurality of current values detected by the electric current detecting unit for the period from the first time to the second time are equal to each other, the resistance obtaining unit obtains the normal internal resistance $R_j(T_{ja})$.

In the above battery control system, since the current values of the charging currents obtained for the period from the first time to the second time are equal to each other, the normal internal resistance $R_j(T_{ja})$ is obtained. For this reason, an error due to a fluctuation in the electric current is suppressed, and the more accurate normal internal resistance $R_j(T_{ja})$ of the secondary battery can be obtained.

Further, in the above battery control system, preferably, the predetermined time in the resistance obtaining unit is 0.1 seconds or less.

When the predetermined time is made to be shorter than 1.0 second, the ratio of the diffusion resistance in ions in the positive electrode plate and the negative electrode plate included in the obtained (calculated) normal internal resistance RAT) can be further reduced. In the battery control system, since the predetermined time from the first time to the second time is 0.1 seconds or less, when the charge is carried out by a large electric current, the deposition of metallic lithium on the negative electrode plate of the secondary battery is securely suppressed, and simultaneously the secondary battery can be suitably charged to a higher inter-terminal voltage.

Any one of the above battery control systems may include a normal internal resistance storage unit for storing the normal internal resistance $R_j(T_{ja})$ of the secondary battery at the input time, which is externally input.

For example, when the battery control system is installed in a vehicle, the normal internal resistance $R_j(T_{ja})$ of the secondary battery can be measured by using the DC power supply apparatus or the like installed outside the system (outside the vehicle) at the time of safety inspection or the like of the vehicle.

The battery control system has the normal internal resistance storage unit. Therefore, the normal internal resistance $R_j(T_{ja})$ measured by the apparatus outside the system is stored in the normal internal resistance storage unit, and this can be utilized. As a result, even when the resistance obtaining unit is not provided into the battery control system (in the vehicle), the deposition of metallic lithium on the negative electrode plate of the secondary battery is securely suppressed by using the normal internal resistance $R_j(T_{ja})$, and simultaneously the secondary battery can be charged suitably to a higher inter-terminal voltage.

An example of a method for obtaining the normal internal resistance of the secondary battery from the outside of the battery control system is a measuring method using an apparatus installed outside the battery control system, such as a DC power supply apparatus, a voltmeter and an ammeter. More concretely, examples of the method for obtaining the normal internal resistance using these external apparatuses include the DC-IR method and an AC impedance (AC-IR) method.

DESCRIPTION OF THE REFERENCE SIGNS

20 Hybrid vehicle control device (Control device)
30 Front motor (Power supply)
40 Rear motor (Power supply)
50 Engine (Power supply)
101, 101A Lithium ion secondary battery
120 Positive electrode plate
130 Negative electrode plate
$AT_j$ Normal temperature range
$AT_l$ Low-temperature range
BS1, BS2, BS3 Battery control system
Ic Charging current
IF Current value
$I_m(T)$ Allowable charging current
P1 First time
P2 Second time
R(T) Internal resistance
$R_0(T)$ Initial internal resistance
$R_j(T_j)$ Normal internal resistance
$R_l(T_l)$ Low-temperature internal resistance
$R_r(T)$ Reaction resistance
$R_{rj}(T_j)$ Normal reaction resistance
$R_{rl}(T_l)$ Low-temperature reaction resistance
SC Charging state
T Battery temperature
$T_{ja}$ First battery temperature (Predetermined battery temperature)
$T_j$ Temperature (within Normal temperature range)
$T_l$ Temperature (within Low-temperature range)
TM1 Predetermined time
$V_m(T)$ Maximum inter-terminal voltage
$V_{m0}(T)$ Initial maximum inter-terminal voltage
VZ Open inter-terminal voltage
W1 First ratio (Percentage $R_{rj}(T_j)/R_j(T_j)$)
W2 Second ratio (Percentage $R_{rl}(T_l)/R_l(T_l)$)
ΔR(T) Difference resistance
ΔV(T) Difference voltage (Difference between open inter-terminal voltage at first time and inter-terminal voltage at second time)

MODE FOR CARRYING OUT THE INVENTION

First Embodiment

Figure 1:
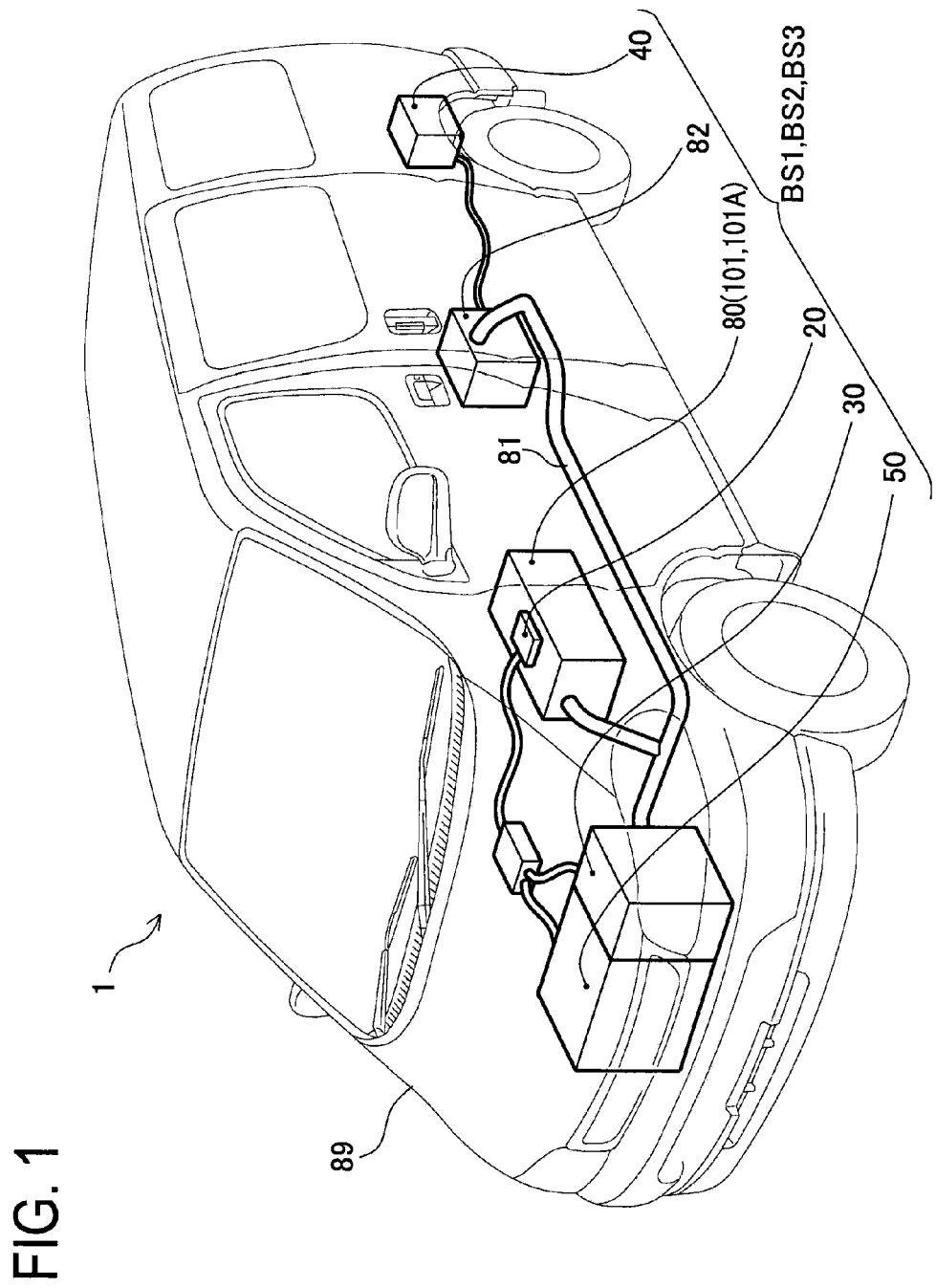
FIG. 1 is a perspective view of a vehicle using a battery control system of first and second embodiments and first modified example.

A first embodiment of the present invention will be described below with reference to drawings. First a vehicle 1 using a battery control system BS1 according to the first embodiment will be described. FIG. 1 is a perspective view of the vehicle 1.

The vehicle 1 has a plurality of (sixty, in the first embodiment) lithium-ion secondary batteries (hereinafter, simply referred to also as secondary batteries) 101 composing a battery pack 80, a front motor 30, a rear motor 40, an engine 50 and a hybrid vehicle control device (hereinafter, referred to also as an HV control device) 20 for controlling charge of the secondary batteries 101 from the front motor 30, the rear motor 40 and the engine 50. The vehicle 1 is a hybrid vehicle further having a cable 81, an inverter 82 and a vehicle body 89. The battery control system BS1 in the vehicle 1 includes the secondary batteries 101, the front motor 30, the rear motor 40, the engine 50 and the HV control device 20.

Figure 2:
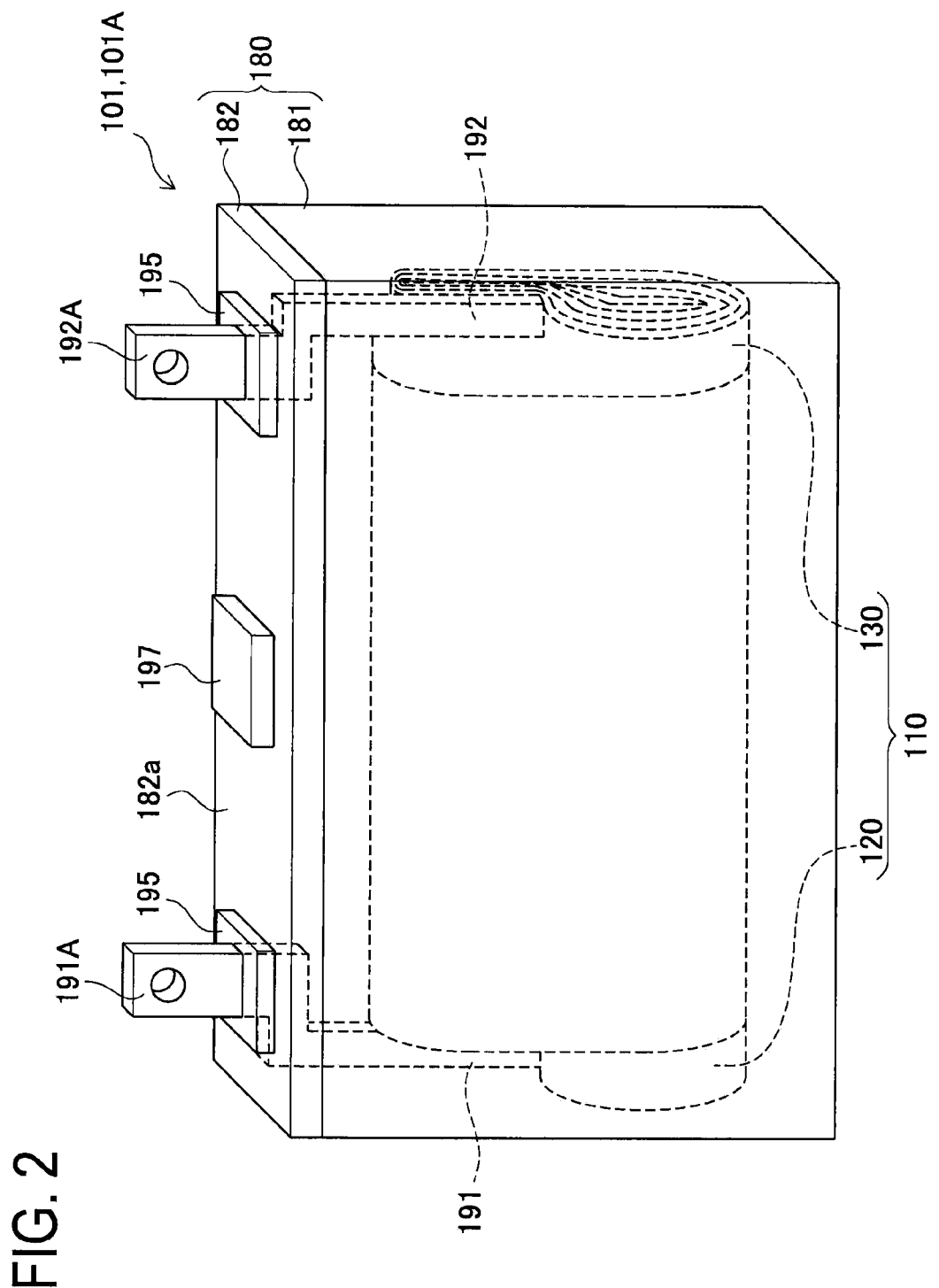
FIG. 2 is a perspective view of a lithium ion secondary battery of first and second embodiments and first modified example.

The secondary batteries 101 composing the battery pack 80 are lithium-ion secondary batteries each having a positive electrode plate 120 and a negative electrode plate 130. In each secondary battery 101, as shown in FIG. 2, an electrode body 110 and an electrolytic solution (not shown) are housed in a battery case 180 having a rectangular box shape. The electrolytic solution is an organic electrolytic solution obtained by adding $LiPF_6$ as a solute to a mixed organic solvent obtained by adjusting ethylene carbonate, ethyl methyl carbonate and dimethyl carbonate.

Further, the battery case 180 of the secondary battery 101 has a battery case main body 181 and a sealing lid 182 made of aluminum. A transparent insulating film (not shown) that is made of resin and is bent into a box shape is laid between the battery case 180 and the electrode body 110.

The sealing lid 182 has a rectangular plate shape, and closes an opening of the main body 181 and is welded to the main body 181. A positive terminal portion 191A and a negative terminal portion 192A positioned on front ends of a positive current collector 191 and a negative current collector 192 connected to the electrode body 110 penetrate the sealing lid 182 to protrude from a lid surface 182a facing upward in FIG. 2. An insulating member 195 made of insulating resin is laid between the positive terminal portion 191A or the negative terminal portion 192A and the sealing lid 182 so as to insulate them. Further, a safety valve 197 having a rectangular plate shape is also sealed to the sealing lid 182.

The electrode body 110 is configured so that the positive electrode plate 120 and the negative electrode plate 130 each having a band shape are wound into a flattened shape via a band-shaped separator (not shown) made of porous polyethylene. The positive electrode plate 120 and the negative electrode plate 130 of the electrode body 110 are jointed to the positive current collector 191 or the negative current collector 192 that have a plate shape bent into a crank shape. The positive electrode plate 120 of the electrode body 110 having a thin-plate band shape has positive current collecting foil (not shown) that has a band shape and is made of aluminum, and a positive active material layer (not shown) formed on both main surfaces of the positive current collecting foil.

On the other hand, the negative electrode plate 130 having a thin-plate band shape has negative current collecting foil (not shown) that has a band shape and is made of copper, and a negative active material layer (not shown) formed on both main surfaces of the negative current collecting foil. The negative active material layer includes negative active material particles made of natural graphite.

Internal resistance R(T) of the secondary battery 101 at a battery temperature T includes DC resistance Rd(T) of the secondary battery 101 (resistance generated by electrolytic solution in a separator or conducting resistance of the current collectors 191 and 192), diffusion resistance Rs(T) of ions in the positive electrode plate 120, diffusion resistance Rn(T) of ions in the negative electrode plate 130, reaction resistance Rp(T) of the positive electrode plate 120, and reaction resistance $R_r(T)$ of the negative electrode plate 130. Concretely, the internal resistance can be expressed by R(T)=Rd(T)+Rs (T)+Rn(T)+Rp(T)+$R_r$(T). The DC resistance Rd(T) of the secondary battery 101, the diffusion resistance Rs(T) in the positive electrode plate 120, the reaction resistance Rn(T) in the negative electrode plate 130, the reaction resistance Rp(T) of the positive electrode plate 120 and the reaction resistance $R_r$(T) of the negative electrode plate 130 are functions of the battery temperature T. For this reason, the internal resistance R(T) is also a function of the battery temperature T, which is changed by the battery temperature T.

The negative electrode plate 130 using the negative active material particles made of natural graphite shows the following characteristics with regard to the reaction resistance $R_r$(T). That is to say, in the reaction resistance $R_r$(T) of the negative electrode plate 130 in the secondary battery 101, normal reaction resistance $R_{rj}(T_j)$ at temperature $T_j$ where the battery temperature T is within a normal temperature range $AT_j$ (concretely, a range of 20 to 45° C.) is sufficiently lower than DC resistance $Rd(T_j)$ of the secondary battery 101 ($R_{rj}(T_j)$<$Rd(T_j)$). On the other hand, when the battery temperature T is temperature $T_l$ within a low-temperature range $AT_l$ (concretely, −30 to 0° C.), low-temperature reaction resistance $R_{rl}(T_l)$ becomes high, and is higher than the DC resistance $Rd(T_l)$ of the secondary battery ($R_{rl}(T_l)$>$Rd(T_l)$).

The negative electrode plate 130 has a characteristic such that the low-temperature reaction resistance $R_{rl}(T_l)$ at temperature $T_l$ in the low-temperature range $AT_l$ is higher than the normal reaction resistance $R_{rj}(T_j)$ at the temperature $T_j$ within the normal temperature range $AT_j$($R_{rl}(T_l)$>$R_{rj}(T_j)$). Concretely, the low-temperature reaction resistance $R_{rl}(T_l)$ has a value that is 7 or more times larger than the normal reaction resistance $R_{rj}(T_j)$.

Further, a first ratio W1(=$R_{rj}(T_j)/R_j(T_j)$) of the normal reaction resistance $R_{rj}(T_j)$ in the normal internal resistance RAT) as the internal resistance of the secondary battery 101 at the temperature $T_j$ within the normal temperature range is 10% or less. A second ratio W2 (=$R_{rl}(T_l)/R_l(T_l)$) of the low-temperature reaction resistance $R_{rl}(T_l)$ in the low-temperature internal resistance $R_l(T_l)$ as the internal resistance of the secondary battery at the temperature $T_l$ within the low-temperature range $AT_l$ is 20% or more. When the negative electrode plate 130 has the characteristic that the second ratio W2 is larger than the first ratio W1, namely, when the temperature is low, the reaction resistance becomes particularly high, and the ratio of the reaction resistance in the internal resistance of the secondary battery 101 becomes also large.

When the secondary battery 101 is charged, polarization occurs in the negative electrode plate 130 by the reaction resistance $R_r$(T) of the negative electrode plate 130. Further, the larger a product of the reaction resistance $R_r$(T) of the negative electrode plate 130 and a charging current is, the larger this polarization becomes. Therefore, at the time of charging, when a large electric current is applied to the secondary battery 101, large polarization occurs in the negative electrode plate 130, and thus an electric potential of the negative electrode plate 130 is occasionally lower than an electric potential of metallic lithium. As a result, the metallic lithium is deposited on the negative electrode plate 130. That is to say, when the charging current to the secondary battery 101 is constant, larger polarization easily occurs and the metallic lithium is deposited more easily in the negative electrode plate 130 at the temperature $T_l$ where the battery temperature T is within the low-temperature range $AT_l$ in comparison with the temperature $T_j$ where the battery temperature T is within the normal temperature range $AT_j$.

Figure 3:
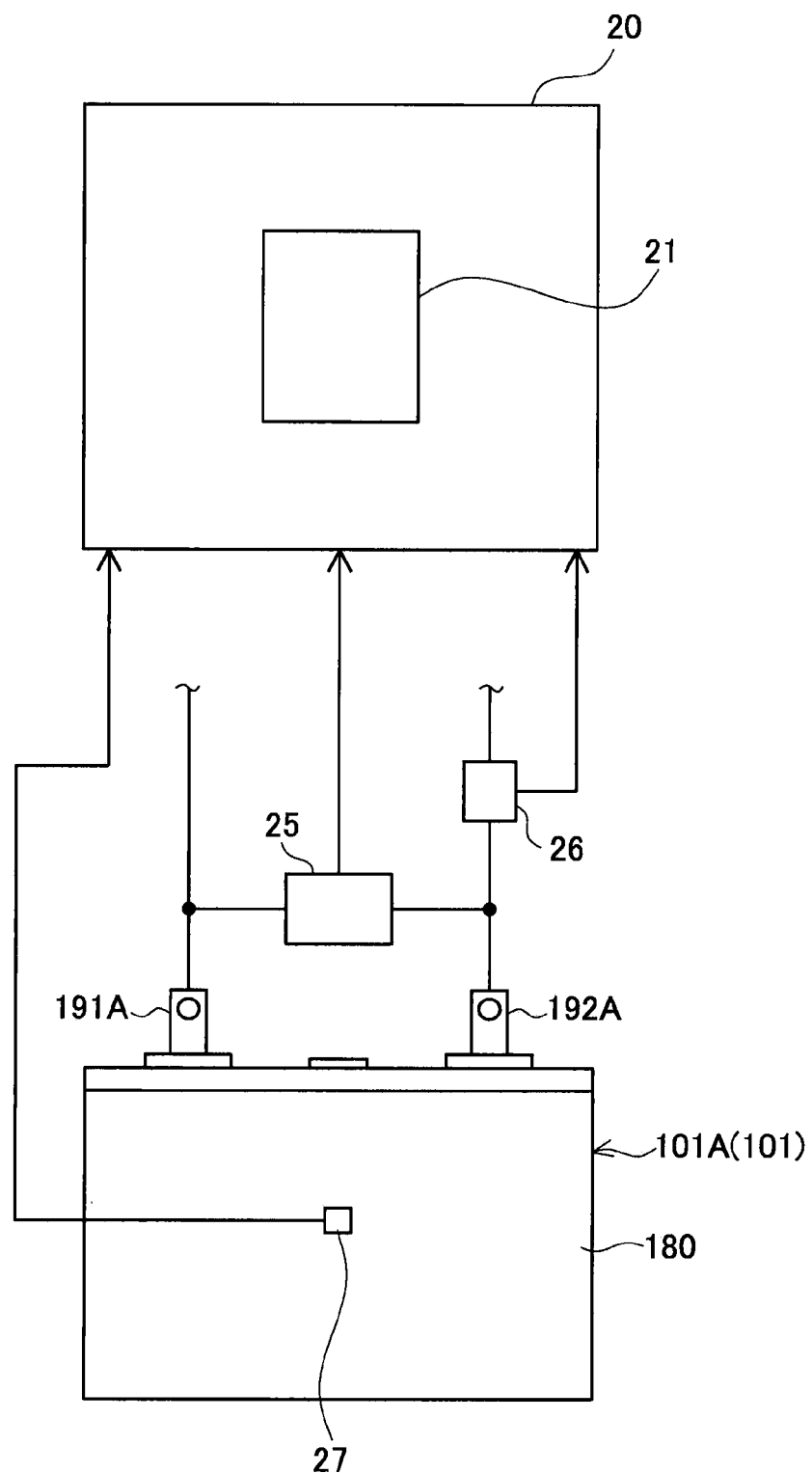
FIG. 3 is an explanatory diagram of a HV control device of first and second embodiments and first modified example.

The HV control device 20 of the battery control system BS1 will be described below. The HV control device 20 includes a microcomputer 21 having a CPU, an ROM and an RAM, not shown, and being operated by a predetermined program. The HV control device 20 has a voltage sensor 25 for measuring an inter-terminal voltage V of one secondary battery 101A of the secondary batteries 101 composing the battery pack 80, a current sensor 26 for measuring a level of a DC current flowing in the secondary battery 101A (the battery pack 80), and a temperature sensor 27 for measuring the battery temperature T of the secondary battery 101A (see FIG. 3). The voltage sensor 25 measures a voltage between the positive terminal portion 191A and the negative terminal portion 192A of the secondary battery 101A (see FIG. 3). The current sensor 26 is a publicly known DC current sensor. The temperature sensor 27 is arranged so that its temperature measuring portion touches the outside of the battery case 180 of the secondary battery 101A.

Figure 4:
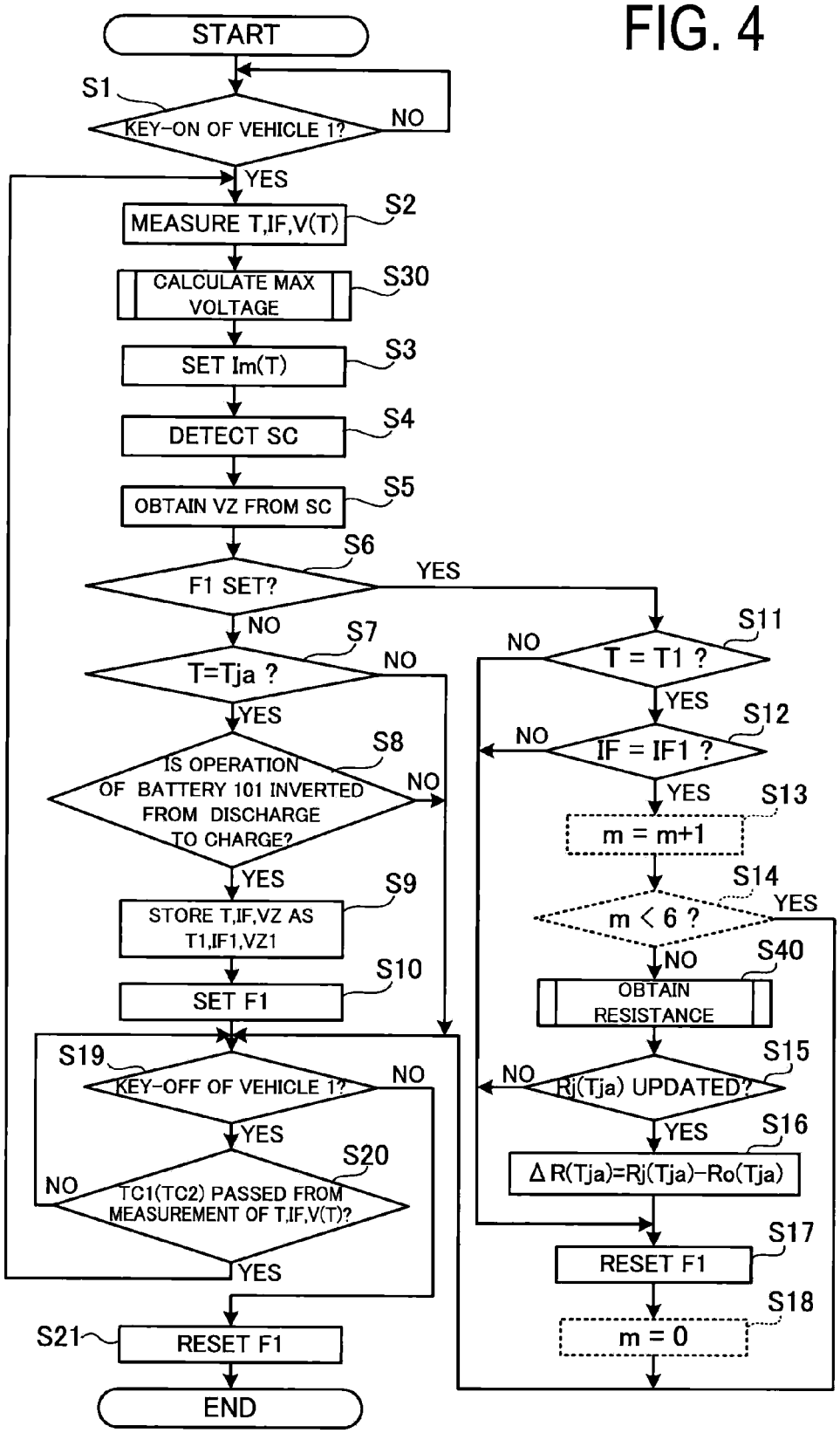
FIG. 4 is a flowchart of first embodiment and first modified example.

The HV control device 20 can detect states of the secondary batteries 101 (the battery pack 80), the front motor 30, the rear motor 40, the engine 50 and the inverter 82 directly or via the sensors, and makes various controls according to states of the respective portions. Therefore, control of the secondary batteries 101 (the battery pack 80) to be conducted by the HV control device 20 in the battery control system BS1 of the first embodiment will be described in detail below with reference to flowcharts in FIGS. 4, 5 and 8. In the first embodiment, a main routine M1 shown in FIG. 4 is executed. Steps S13, S14 and S18 indicated by broken lines in the main routine M1 are steps to be used in a first modified example, described later, and are not used in the first embodiment.

The ROM (not shown) of the microcomputer 21 stores an initial maximum inter-terminal voltage $V_{m0}$(T) of the secondary battery 101A in a maximum inter-terminal voltage $V_m$(T) for each battery temperature T, an allowable charging current $I_m$(T) of the secondary battery 101A for each battery temperature T, and an open inter-terminal voltage VZ of the secondary battery 101A for each state of charge SC of the secondary battery 101A in advance. Further, the ROM also stores initial internal resistance $R_0(T_{ja})$ of the secondary battery 101A at a predetermined first battery temperature $T_{ja}$, within the normal temperature range $AT_j$ in advance.

The main routine M1 shown in FIG. 4 will be described. When the operation of the vehicle 1 is started (key on) (YES at step S1), the sequence goes to step S2, and the battery temperature T of the secondary battery 101A, a current value IF flowing in the secondary battery 101A, and an inter-terminal voltage V(T) of the secondary battery 101A at this time are respectively measured. In this main routine M1, the steps S2 to S19 are repeated for predetermined cycle time TC1 (at every 0.1 seconds, in the first embodiment) until the vehicle 1 is keyed off (see step S20, described later). For this reason, in the first embodiment, the battery temperature T, the current value IF, and the inter-terminal voltage V(T) are measured at every cycle time TC (0.1 seconds). Thereafter, the sequence goes to step S30 for a maximum voltage calculating subroutine.

Figure 5:
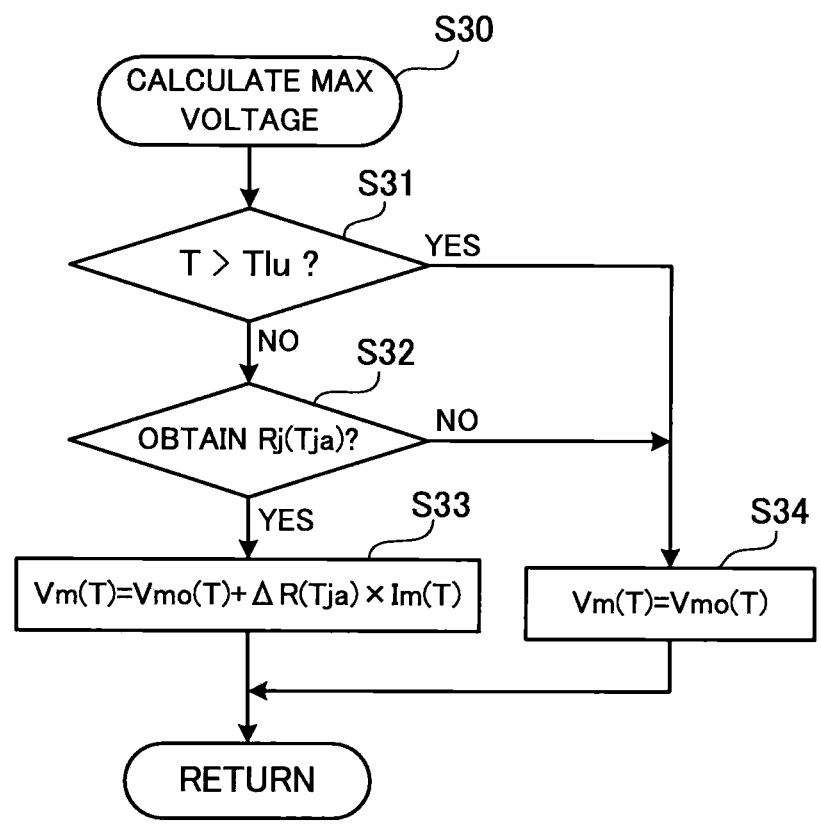
FIG. 5 is a flowchart of first embodiment and first modified example.

The maximum voltage calculating subroutine S30 will be described with reference to FIG. 5. The maximum inter-terminal voltage $V_m$(T) set at the maximum voltage calculating subroutine S30 limits an upper limit of the inter-terminal voltage V(T) of the secondary battery 101 (101A).

At the maximum voltage calculating subroutine S30, a determination is made whether the battery temperature T measured at step S2 is higher than the low-temperature range $AT_l$ or not, concretely, than a low-temperature range maximum temperature $T_{lu}$ (0° C. in the first embodiment), which is a maximum temperature of the low-temperature range $AT_l$ (step S31).

When YES, that is, when the battery temperature T is higher than the low-temperature range maximum temperature $T_{lu}$, the sequence goes to step S34. On the other hand, when NO, that is, when the battery temperature T is not higher than the low-temperature range maximum temperature $T_{lu}$, the sequence goes to step S32.

When the secondary battery 101A (101) is charged by using the negative electrode plate 130, if the battery temperature T is low, large polarization may be occurred in the negative electrode plate 130 relatively easily. Therefore, in the first embodiment, when the battery temperature T is higher than the low-temperature range maximum temperature $T_{lu}$, the initial maximum inter-terminal voltage $V_{m0}(T)$ stored in the ROM (not shown) of the microcomputer 21 is used as the maximum inter-terminal voltage $V_m(T)$, so that the battery control system BS1 is further simplified.

At step S32, by a resistance obtaining subroutine S40 described later, it is determined whether the normal internal resistance $R_j(T_{ja})$ of the secondary battery 101A at the predetermined first battery temperature $T_{ja}$ (20° C. in the first embodiment), described later, in the normal temperature range AT) is already obtained or not.

When NO, namely, when the normal internal resistance $R_j(T_{ja})$ is not yet obtained at the resistance obtaining subroutine S40, the sequence goes to step S34. On the other hand, when YES, namely, when the normal internal resistance $R_j(T_{ja})$ is already obtained, the sequence goes to step S33, and the maximum inter-terminal voltage $V_m(T)$ is set to a value obtained by adding a product ($\Delta R(T_{ja}) \times I_m(T)$) of difference resistance $\Delta R(T_{ja})$ and the allowable charging current $I_m(T)$, described later, to the initial maximum inter-terminal voltage $V_{m0}(T)$. That is to say, the maximum inter-terminal voltage $V_m(T)$ is set to $V_m(T)=V_{m0}(T)+\Delta R(T_{ja}) \times I_m(T)$. After this setting, the maximum voltage calculating subroutine S30 is terminated, and the sequence goes back to the main routine M1.

On the other hand, when the battery temperature T is higher than the low-temperature range maximum temperature $T_{lu}$ at step S31, and when the normal internal resistance $R_j(T_{ja})$ is not yet obtained at step S32 in the resistance obtaining subroutine S40, the maximum inter-terminal voltage $V_m(T)$ is set, at step S34, to the initial maximum inter-terminal voltage $V_{m0}(T)$ stored in the ROM of the microcomputer 21 in advance. After this setting, the maximum voltage calculating subroutine S30 is ended and the sequence goes back to the main routine M1.

At step S3 of the main routine M1 shown in FIG. 4, the allowable charging current $I_m(T)$ relating to a charging current Ic to be applied to the secondary batteries 101 is set based on the battery temperature T measured at step S2. As a result, the charging current Ic that is larger than the allowable charging current $I_m(T)$ is prevented from flowing in the secondary batteries 101. As the allowable charging current $I_m(T)$, concretely, one is selected from the allowable charging currents $I_m(T)$ stored in the ROM for each battery temperature T in advance according to the battery temperatures T at each time point.

The state of charge SC (a value of SOC) of the secondary battery 101A at that time is detected at step S4. Concretely, after the secondary battery 101A of which the state of charge SC is known is mounted to the vehicle 1, the HV control device 20 separately calculates the state of charge SC of the secondary battery 101A based on histories of a value of a discharge current flowing in the secondary battery 101A and values of the charging current Ic. Therefore, this value is read at step S4.

Thereafter, at step S5, the open inter-terminal voltage VZ of the secondary battery 101A is obtained according to the detected state of charge SC. Concretely, one is selected from the open inter-terminal voltages VZ stored in the ROM for each state of charge SC in advance according to the detected state of charge SC of the secondary battery 101A, and this is used as the open inter-terminal voltage VZ at that time.

Thereafter, a determination is made at step S6 whether an inversion flag F1, described later, is set or not. When YES, namely, when the inversion flag F1 is set, the sequence goes to step S11. On the other hand, when NO, namely, when the inversion flag F1 is reset, the sequence goes to step S7.

At step S7, it is determined whether the battery temperature T obtained (measured) at step S2 is the predetermined first battery temperature $T_{ja}$ (in the first embodiment, for example, 20° C.) within the normal temperature range $AT_j$ (20° C.≤T≤45° C.). When NO, namely, when the battery temperature T is not the first battery temperature $T_{ja}$, the steps from S8 to S10 are skipped and the sequence goes to step S19. On the other hand, when YES, namely, when the battery temperature T is the first battery temperature $T_{ja}$, the sequence goes to step S8.

The first embodiment describes an example where when the battery temperature T is the predetermined first battery temperature $T_{ja}$ within the normal temperature range $AT_j$, a process such as step S8 is executed. However, for example, when the battery temperature T is within the normal temperature range $AT_j$, and is also predetermined temperatures (for example, a second battery temperature (=30° C.) and a third battery temperature (=40° C.)) other than the first battery temperature $T_{ja}$, the process such as step S8 is executed similarly. At the resistance obtaining subroutine S40, described later, the normal internal resistance at any of the above temperatures is calculated, and this may be used.

At step S8, it is determined from the current value IF of the secondary battery 101A obtained (measured) at step S2 whether the operation of the secondary battery 101A is changed (inverted) from discharging to charging or not. When NO, namely, when the operation of the secondary battery 101A is not inverted from discharging to charging, the sequence goes to step S19. On the other hand, when YES, namely, when the operation of the secondary battery 101A is inverted from discharging to charging, the sequence goes to step S9.

At step S9, the battery temperature T, the current value IF and the open inter-terminal voltage VZ at the timing immediately after the operation of the secondary battery 101A is inverted from discharging to charging (first time P1) obtained at step S2 are stored as a first time battery temperature T1, a first time current value IF1 and a first time open voltage VZ1. The inversion flag F1 is set in the microcomputer 21 (step S10), and the sequence goes to step S19.

On the other hand, when it is determined at step S6 that the inversion flag F1 has been set (YES), namely, in a case of timing (second time P2) of a next cycle time TC1 that is 0.1 seconds after the setting of the inversion flag F1, the sequence goes to step S11 where it is determined whether the battery temperature T at the second time P2 is equal to the first time battery temperature T1 stored at step S9 or not, that is, the battery temperature T1 of 0.1 seconds before. When NO, i.e., when the battery temperature T at the second time P2 is different from the first time battery temperature T1, the sequence goes to step S17. On the other hand, when YES, i.e., when the battery temperature T at the second time P2 is equal to the first time battery temperature T1, the sequence goes to step S12.

Figure 7:
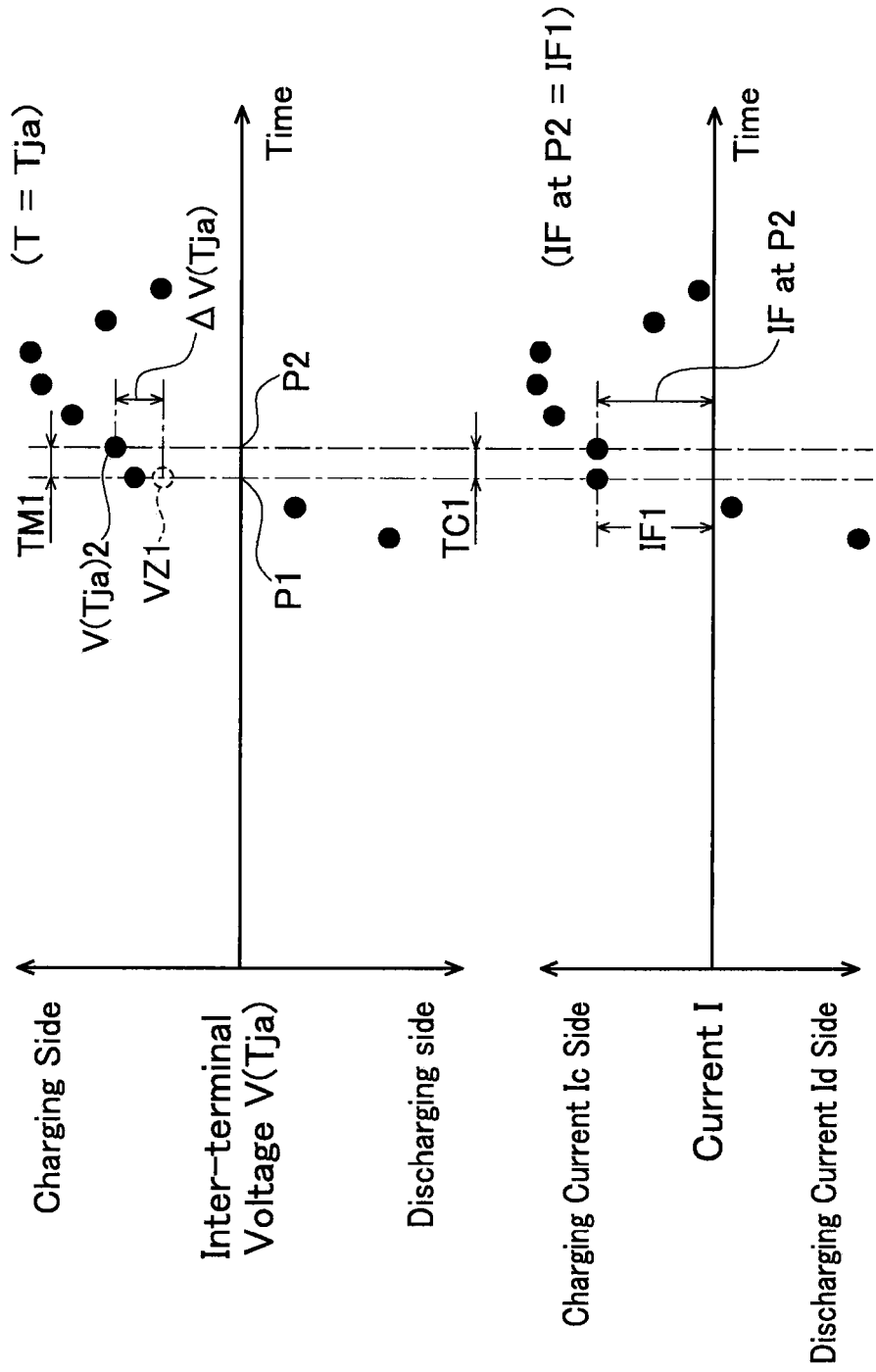
FIG. 7 is a diagram to explain the first embodiment.

At step S12, it is determined whether the current value IF at the second time P2 measured at step S2 is the same as a first time current value IF1 at first time P1 stored at step S10 or not. When NO, i.e., when the current value IF at the second time P2 is different from the first time current value IF1, the sequence goes to step S17. On the other hand, when YES, i.e., when the current value IF at the second time P2 is equal to the first time current value IF1 (see an explanatory diagram in FIG. 7), the sequence goes to the resistance obtaining subroutine at step S40.

Figure 6:
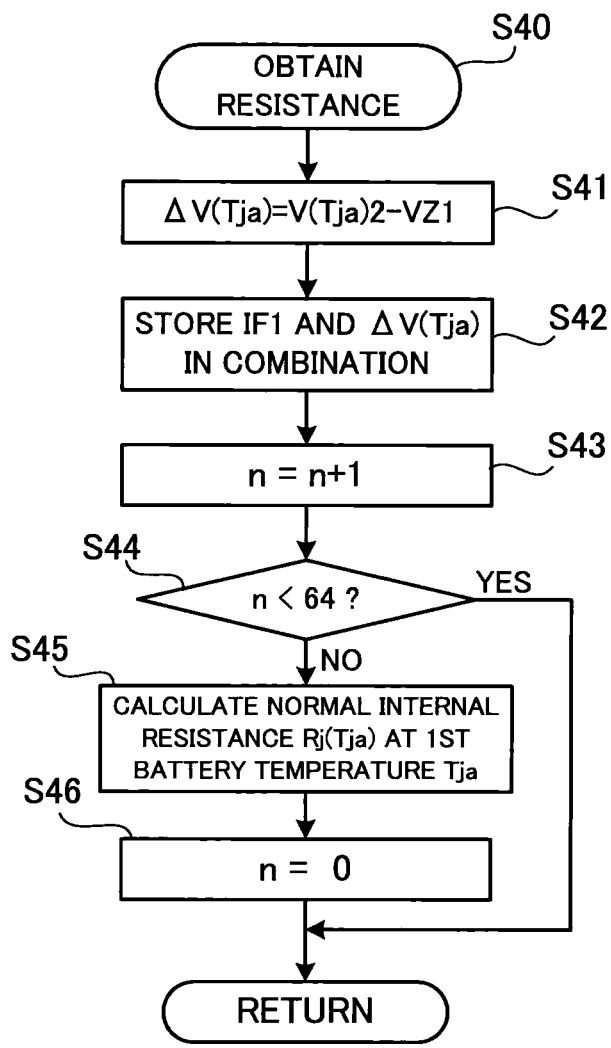
FIG. 6 is a flowchart of first embodiment and first modified example.

The resistance obtaining subroutine S40 will be described with reference to FIG. 6. The resistance obtaining subroutine S40 is a resistance obtaining unit for obtaining the normal internal resistance $R_j(T_{ja})$ of the secondary batteries 101 at the time when the battery temperature T is the first battery temperature $T_{ja}$ (20° C.) using a pseudo-DC resistance measuring (DC-IR) method. In the main routine M1, as described above, the battery temperature T, the current value IF and the inter-terminal voltage V(T) (accordingly, the open inter-terminal voltage VZ) are measured and detected at step S2 in every predetermined cycle time TC1 (0.1 seconds). Therefore, at the resistance obtaining subroutine S40 in the first embodiment, when the current value IF measured at the second time P2 after a predetermined time TM1 (0.1 seconds) is equal to the first time current value IF1, the normal internal resistance $R_j(T_{ja})$ of the secondary battery 101A at the first battery temperature $T_{ja}$ is obtained based on a change (difference voltage $\Delta V(T_{ja})$, described later) in the inter-terminal voltage of the secondary battery 101A caused during this time period and the current value IF (the first time current value IF1).

More concretely, at step S41, the first time open voltage VZ1 stored 0.1 seconds before at step S9 is subtracted from the inter-terminal voltage $V(T_{ja})$ (a second time inter-terminal voltage $V(T_{ja})$2) at the second time P2 so that a difference is calculated, and this difference is assumed as the difference voltage $\Delta V(T_{ja})$ at the first battery temperature $T_{ja}$.

At step S42, the calculated difference voltage $\Delta V(T_{ja})$ and the stored first time current value IF1 are stored as a pair in the RAM.

Next, "n" representing the number of stored pairs is incremented (step S43). At step S44, it is determined whether the number n is smaller than 64 or not. When YES, that is, when the number n is smaller than 64, the resistance obtaining subroutine S40 is ended, and the sequence goes back to the main routine M1. This is because the number of pairs of the difference voltages $\Delta V(T_{ja})$ and the first time current values IF1 is insufficient to calculate the normal internal resistance $R_j(T_{ja})$ with small error.

Figure 8:
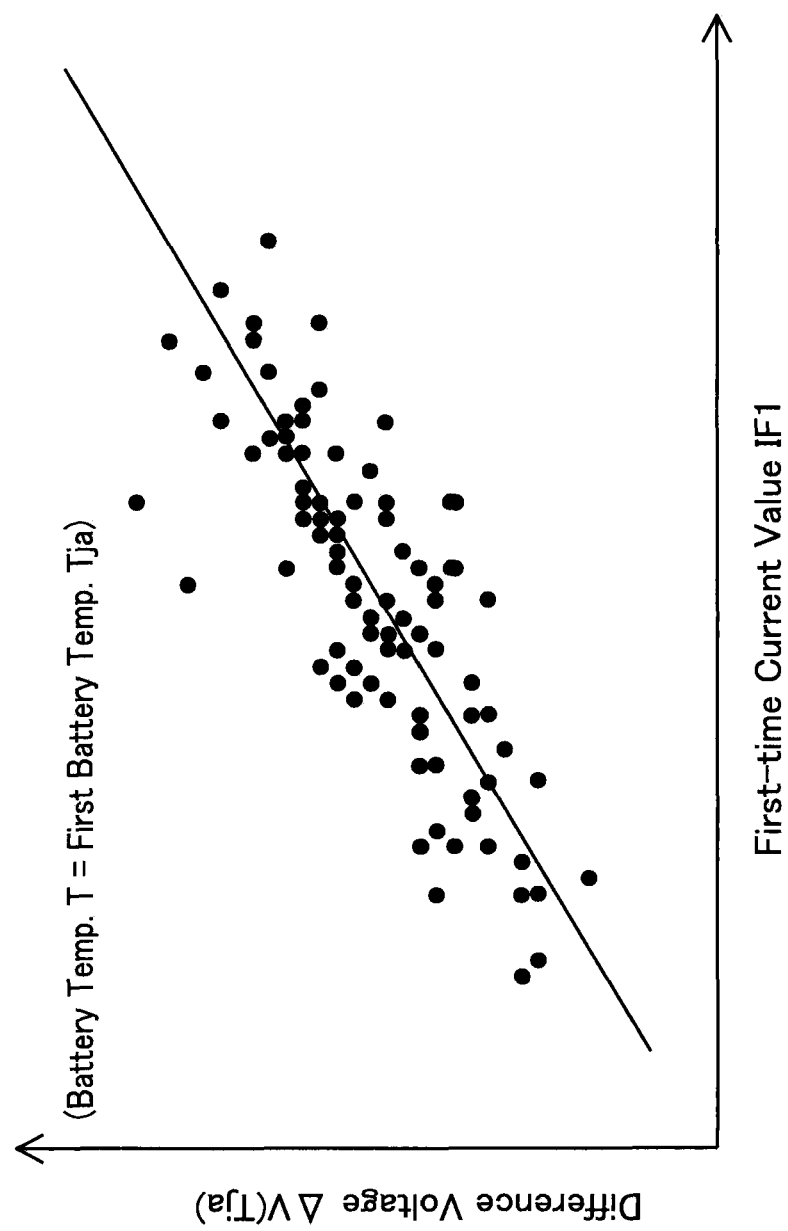
FIG. 8 is a graph to explain the first embodiment.

On the other hand, when NO, namely, when the number n is 64, the normal internal resistance $R_j(T_{ja})$ at the first battery temperature $T_{ja}$ is calculated based on 64 pairs of the difference voltages $\Delta V(T_{ja})$ and the first time current values IF1 (step S45). Concretely, as shown in FIG. 8, coordinate points indicating the combinations of the first time current values IF1 and the difference voltages $\Delta V(T_{ja})$ are dotted on a graph in which the first time current value IF1 is plotted along a horizontal axis and the difference voltage $\Delta V(T_{ja})$ is plotted along a vertical axis. A proximate line of a plurality of coordinate points is obtained by using a least squares method. A tilt of the proximate line is the new normal internal resistance $R_j(T_{ja})$ of the secondary batteries 101 at the initial battery temperature $T_{ja}$. In such a manner, the new normal internal resistance $R_j(T_{ja})$ at the initial battery temperature $T_{ja}$ is obtained.

At step S46, the number n is set to 0 (zero), the resistance obtaining subroutine S40 is ended, and the sequence goes back to the main routine M1 and goes to step S15.

In step S15 of the main routine M1, it is determined whether the normal internal resistance $R_j(T_{ja})$ of the secondary battery 101A at the first battery temperature $T_{ja}$ is newly obtained (updated) or not at the resistance obtaining subroutine S40. When NO, namely, when the normal internal resistance $R_j(T_{ja})$ is not updated at the resistance obtaining subroutine S40, step S16 is skipped, and the sequence goes to step S17. On the other hand, when YES, namely, when the normal internal resistance $R_j(T_{ja})$ is updated, the sequence goes to step S16.

At step S16, the difference resistance $\Delta R(T_{ja})$ of the secondary battery 101A when the battery temperature T is the first battery temperature $T_{ja}$ is obtained. The difference resistance $\Delta R(T_{ja})$ is concretely a difference $(\Delta R(T_{ja})=R_j(T_{ja})-R_0(T_{ja}))$ that is obtained by subtracting the initial internal resistance $R_0(T_{ja})$ at the first battery temperature $T_{ja}$ from the normal internal resistance $R_j(T_{ja})$ at the first battery temperature $T_{ja}$ obtained at the resistance obtaining subroutine S40. As the initial internal resistance $R_0(T_{ja})$, a value $(R_0(T_{ja}))$ of the initial internal resistance $R_0(T)$ stored in the ROM in advance corresponding to the first battery temperature $T_{ja}$ is used.

In such a manner, the difference resistance $\Delta R(T_{ja})$ is obtained, so that YES is selected at step S32 in the maximum voltage calculating subroutine S30 thereafter, and the sequence goes to step S33. That is to say, the maximum inter-terminal voltage $V_m(T)$ of the secondary batteries 101 in the low-temperature range $AT_l$ can be set by using the difference resistance $\Delta R(T_{ja})$, the initial maximum inter-terminal voltage $V_{m0}(T)$ and the allowable charging current $I_m(T)$.

The inversion flag F1 is reset at step S17 and the sequence goes to step S19. At step S19, it is determined whether the vehicle 1 is keyed off or not. When NO at this step, the sequence goes to step S20. When YES, to the contrary, the sequence goes to step S21.

At step S20, it is determined whether or not the predetermined cycle time TC1 (0.1 seconds) passes since the measurement of the battery temperature T, the current value IF and the inter-terminal voltage V(T) of the secondary battery 101A at step S2. When NO, namely, when the predetermined cycle TC1 does not pass since the last measurement, the sequence goes back to step S19, and the steps S19 and S20 are repeated (namely, to wait until the cycle time TC1 passes). On the other hand, when YES, namely, when the cycle time TC1 passes since the measurement at step S2, the sequence goes back to step S2, and the steps S2 to S20 are repeated. On the other hand, the inversion flag F1 is reset at step S21 and the main routine M1 is ended regardless of whether the inversion flag F1 is set or not.

In the first embodiment, the HV control device 20 corresponds to a control device, the front motor 30, the rear motor 40 and the engine 50 correspond to power supplies, the allowable charging current $I_m(T)$ corresponds to the allowable charging current. The microcomputer 21 of the HV control device 20 that stores the initial maximum inter-terminal voltages $V_{m0}(T)$ of the secondary battery 101A for each battery temperature T, the initial internal resistances $R_0(T_{ja})$ of the secondary battery 101A at the first battery temperature $T_{ja}$ within the normal temperature range $AT_l$, the allowable charging currents $I_m(T)$ of the secondary battery 101A for each battery temperature T, and the open inter-terminal voltages VZ of the secondary battery 101A for each state of charge SC of the secondary battery 101A corresponds to a voltage storage unit, a resistance storage unit, a current storage unit and an open inter-terminal voltage storage unit, respectively. Further, the resistance obtaining subroutine S40 corresponds to a resistance obtaining unit, step S16 in the main routine M1 corresponds to a difference obtaining unit, the maximum voltage calculating subroutine S30 corresponds to a maximum voltage calculating unit, step S5 corresponds to a charging state detecting unit, and step S6 corresponds to an open inter-terminal voltage obtaining unit, respectively.

The battery control system BS1 according to the first embodiment includes step 16 of obtaining the difference resistance $\Delta R(T_{ja})$ of the secondary battery 101A between the normal internal resistance $R_j(T_{ja})$ obtained at the timing of the first battery temperature $T_{ja}$ (for example, 20° C.) within the normal temperature range $AT_j$ and the initial internal resistance $R_0(T_{ja})$. Further, when the battery temperature T is within the low-temperature range $AT_l$, at the maximum voltage calculating subroutine S30, the maximum inter-terminal voltage $V_m(T)$ is set to a value obtained by adding a product of the difference resistance $\Delta R(T_{ja})$ and the allowable charging current $I_m(T)$ to the initial maximum inter-terminal voltage $V_{m0}(T)$.

Therefore, in the battery control system BS1, when the battery temperature T is within the low-temperate range $AT_l$, a reduction in the charging amount of the secondary battery 101A that is caused by an increase in the internal resistance due to deterioration can be suppressed more in comparison with a case where the charge of the secondary batteries is controlled by using the maximum inter-terminal voltage $V_m(T)$ as a constant value of the initial maximum inter-terminal voltage $V_{m0}(T)$.

Further, like Patent Document 1, not a product of the internal resistance and the electric current but a product of the difference resistance $\Delta R(T_{ja})$ and the allowable charging current $I_m(T)$ equivalent to an increase in the internal resistance is obtained, and this product is added to the initial maximum inter-terminal voltage $V_{m0}(T)$. For this reason, the maximum inter-terminal voltage $V_m(T)$ suitable for the increase in the internal resistance can be obtained.

Further, in the battery control system BS1, when the battery temperature T is within the low-temperature range $AT_l$, at the maximum voltage calculating subroutine S30, not the difference resistance $\Delta R(T_l)$ corresponding to the battery temperature T (a temperature $T_l$ in the low-temperature range $AT_l$) but the difference resistance $\Delta R(T_{ja})$ at the first battery temperature $T_{ja}$ in the normal temperature range $AT_j$ to be a comparatively smaller value than the difference resistance $\Delta R(T_l)$ is used. A product of the difference resistance $\Delta R(T_{ja})$ and the allowable charging current $I_m(T)$ is added to the initial maximum inter-terminal voltage $V_{m0}(T)$, so that the maximum inter-terminal voltage $V_m(T)$ is obtained. For this reason, when the maximum inter-terminal voltage $V_m(T)$ is set to a value larger than the initial maximum inter-terminal voltage $V_{m0}(T)$, even if the internal resistance of the secondary batteries increases due to aging variation, the reduction in the charging amount of the secondary battery 101A can be suppressed. On the other hand, the maximum inter-terminal voltage $V_m(T)$ does not obtain a too large value, and deposition of metallic lithium on the negative electrode plate 130 due to polarization does not occur.

In the battery control system BS1, the secondary battery 101 (101A) uses the negative electrode plate 130 having a characteristic such that the low-temperature reaction resistance $R_{rl}(T_l)$ at the temperature $T_l$ within the low-temperature range $AT_l$ increases more than a case of the normal temperature range M. Even when the internal resistance of the secondary battery 101 increases with age, the battery temperature T is within the low-temperature range $AT_l$, and the charge is carried out by a large electric current like quick charge or charge with regenerative current in a vehicle, the deposition of metallic lithium on the negative electrode plate 130 of the secondary battery 101A is suppressed, and simultaneously the secondary battery 101 (101A) can be charged suitably up to a higher inter-terminal voltage.

Further, the secondary battery 101A uses the negative electrode plate 130 having the above characteristic, namely, a characteristic such that the low-temperature reaction resistance $R_{rl}(T_l)$ has a value that is 7 or more times larger than the normal reaction resistance $R_{rj}(T_j)$, and the first ratio $W1(=R_{rj}(T_j)/R_j(T_j))$ is 10% or less and the second ratio $W2(=R_{rl}(T_l)/R_l(T_l))$ is 20% or more.

In the battery control system BS1, since the charge of the secondary battery 101 (101A) using such a negative electrode plate 130 is controlled, particularly the maximum inter-terminal voltage $V_m(T)$ from which contribution of an increase in the reaction resistance in the negative electrode plate 130 is securely excluded can be obtained. For this reason, when the battery temperature T is within the low-temperature range $AT_l$, the suitable maximum inter-terminal voltage $V_m(T)$ is obtained so that the secondary battery 101 (101A) can be charged.

Further, in the negative electrode plate 130 of the secondary battery 101 used in the battery control system BS1, as described above, the second ratio $W2(=R_{rl}(T_l)/R_l(T_l))$ is larger than the first ratio $W1(=R_{rj}(T_j)/R_j(T_j))$. For this reason, when the secondary batteries 101 are charged at the battery temperature T higher than the low-temperature range $AT_l$, a rise by the internal resistance of the secondary batteries 101 is smaller than a case where charge is carried out at the battery temperature T within the low-temperature range $AT_l$. For this reason, it is considered that even when the initial maximum inter-terminal voltage $V_{m0}(T)$ is used as the maximum inter-terminal voltage $V_m(T)$, a reduction in a battery capacity due to the rise over time in the internal resistance is small.

Therefore, in the battery control system BS1 according to the first embodiment, when the battery temperature T is higher than the low-temperature range $AT_l$, the initial maximum inter-terminal voltage $V_{m0}(T)$ is set to a value of the maximum inter-terminal voltage $V_m(T)$. As a result, when the battery temperature T is higher than the low-temperature range $AT_l$, the maximum inter-terminal voltage $V_m(T)$ does not have to be changed, so that the system can be further simplified.

Further, since the battery control system BS1 is provided with the resistance obtaining subroutine S30, the battery control system BS1 itself can obtain the normal internal resistance $R_j(T_{ja})$ of the secondary battery 101 (101A), and can autonomously change the maximum inter-terminal voltage $V_m(T)$.

When the battery control system BS1 detects the same current values IF of the charging currents Ic at the first time P1 and the second time P2, the normal internal resistance $R_j(T_{ja})$ is obtained by using the difference voltage $\Delta V(T_{ja})$ between a first time open inter-terminal voltage VZ1 of the secondary battery 101A at the first time P1 and a second time inter-terminal voltage $V(T_{ja})$2 of the secondary battery 101A at the second time P2, and the current value IF (the first time current value IF1) of the charging current Ic. That is to say, in the battery control system BS1, the normal internal resistance $R_j(T_{ja})$ of the secondary battery 101 (101A) can be obtained according to a DC-IR method.

Prior to the obtaining of the normal internal resistance RAT) of the secondary batteries according to the DC-IR method, a relationship between the time from the start of charging to the measurement of a voltage (measuring period) and the normal internal resistance $R_j(T_j)$ was verified.

Concretely, the secondary battery A, having a short time passed since being manufactured, is prepared by selecting from the secondary batteries 101 similar to the one in the first embodiment, and the internal resistance (the normal internal resistance) at 25° C. ($T_j$=25° C.) where the battery temperature T was within the normal temperature range $AT_l$ was measured by the DC-IR method. At this time, in the DC-IR method, the time (measuring period) from the start of flowing the charging current Ic to the measurement of the inter-terminal voltage of the secondary battery A was changed into 0.1 seconds, 1.0 second, 10.0 seconds and 20.0 seconds so that the measurement was made. Table 1 shows the normal internal resistance of the secondary battery A (the secondary battery A before an accelerated deterioration test, described later) at the respective measuring periods.

TABLE 1

| Measuring period (sec.) | Normal internal resistance (mΩ) | | Difference resistance ΔR (mΩ) | Calculated max. inter-terminal voltage Vm(−5) (V) |
|---|---|---|---|---|
| | Before accelerated deterioration test (Initial) | After accelerated deterioration test | | |
| 0.1 | 5.0 | 5.8 | 0.8 | 4.126 |
| 1.0 | 5.2 | 6.5 | 1.3 | 4.211 |
| 10.0 | 6.0 | 8.0 | 2.0 | 4.260 |
| 20.0 | 7.0 | 9.6 | 2.6 | 4.302 |

According to Table 1, it is found that the longer the measuring period becomes, the higher the normal internal resistance of the secondary battery A becomes. The reason for this is as follows. Immediately after the charging current Ic starts to be applied to the secondary battery A, the reaction resistance $Rp(T_j)$ of the positive electrode plate 120, the reaction resistance $Rr(T_j)$ of the negative electrode plate 130 and the DC resistance $Rd(T_j)$ of the secondary battery A (the secondary battery 101) are mainly occurred, but thereafter gradually the diffusion resistance $Rs(T_j)$ of ions in the positive electrode plate 120 and the diffusion resistance $Rn(T_j)$ of ions in the negative electrode plate 130 are also occurred. For this reason, when the measuring period is long, besides the reaction resistance $Rp(T_j)$ of the positive electrode plate 120, the reaction resistance $Rr(T_j)$ of the negative electrode plate 130 and the DC resistance $Rd(T_j)$, components of diffusion resistances $Rs(T_j)$ and $Rn(T_j)$ in the electrodes 120 and 130 are added to the normal internal resistance obtained by the DC-IR method.

Thereafter, the accelerated deterioration test was conducted for the secondary battery A. Concretely, with use of a DC power supply apparatus (not shown), the secondary battery A was charged and discharged by a constant current of 4 C, repeatedly 1000 times in an alternative manner, under a temperature environment of 60° C. and within a voltage range of 2.5 to 4.1 V. As to the secondary battery A that was subject to the accelerated deterioration test, the internal resistance (the normal internal resistance) was measured by using the DC-IR method at battery temperature $T(T_j)$ of 25° C. similarly to the condition before the accelerated deterioration test. Table 1 shows also results of the secondary battery A after the accelerated deterioration test.

According to Table 1, as the measuring period is longer, the normal internal resistance of the secondary battery A after the accelerated deterioration test also becomes higher similarly to the initial case. Therefore, it is found that this normal internal resistance of the secondary battery A has a tendency similar to that of the normal internal resistance before the accelerated deterioration test. Further, the difference resistance ΔR before and after the accelerated deterioration test (a difference obtained by subtracting the normal internal resistance before the accelerated deterioration test from the normal internal resistance after the accelerated deterioration test) is 0.8 mΩ at the measuring period of 0.1 seconds, 1.3 mΩ at 1.0 second, 2.0 mΩ at 10.0 seconds, and 2.6 mΩ at 20.0 seconds. As a result, it is found that as the measuring period is longer, the difference resistance ΔR also becomes larger.

The relationship between the maximum inter-terminal voltage and the battery capacity of the secondary batteries 101 was verified. Concretely, as the secondary batteries 101, two secondary batteries (a secondary battery B and a secondary battery C), having a short time passed since being manufactured, were prepared.

Capacities of the secondary batteries B and C were measured. Concretely, discharged capacities at the time when the secondary batteries B and C of 4.1 V (full charging voltage) were discharged up to 2.5 V by a constant (1 C) discharge current under the temperature environment of 25° C. were measured.

A charge and discharge pulse cycle test was conducted on the secondary batteries B and C. In this charge and discharge pulse cycle test, the secondary batteries B and C that were brought into a charging state of SOC 60% under the temperature environment of −5° C. were continuously charged by a constant current of 2 C for 1.0 second, a constant current of 6 C for 1.0 second, and a constant current of 10 C for 1.0 seconds. With downtime of 10.0 seconds, the secondary batteries B and C were continuously discharged by a constant current of 2 C for 1.0 second, a constant current of 6 C for 1.0 second, and a constant current of 10 C for 1.0 second, and thereafter, took a downtime for 10.0 seconds. Such a charge and discharge pulse cycle test was repeated 10 times.

In the charge and discharge pulse cycle test, the maximum inter-terminal voltage $V_m(-5)$ at the battery temperature T of −5° C. was set to different values between the secondary battery B and the secondary battery C. Concretely, the maximum inter-terminal voltage $V_m(-5)$ of the secondary battery B was set to 4.12 V, and the maximum inter-terminal voltage $V_m(-5)$ of the secondary battery C was set to 4.18 V (see Table 2).

After the charge and discharge pulse cycle test, the capacities of the secondary batteries B and C were again measured. Concretely, similarly to the method used before the charge and discharge pulse cycle test, the discharge capacities at the time when the batteries were discharged up to 2.5 V by the constant (1 C) discharge current under a temperature environment of 25° C. were measured. Capacity maintaining factors (%) of the secondary batteries B and C were respectively calculated before and after the charge and discharge pulse cycle test. Concretely, a quotient obtained by dividing the discharge capacities of the secondary batteries B and C after the charge and discharge pulse cycle test by the discharge capacities before the charge and discharge pulse cycle test is expressed by ratio.

Table 2 shows the capacity maintaining factors (%) of the secondary batteries B and C.

TABLE 2

|  | | Max. inter-terminal voltage Vm(−5) (V) | Capacity maintaining factor (%) |
|---|---|---|---|
| Secondary batteries before accelerated deterioration test | Secondary battery B | 4.12 | 99.4 |
|  | Secondary battery C | 4.18 | 90.0 |
| Secondary batteries after accelerated deterioration test | Secondary battery D | 4.12 | 99.4 |
|  | Secondary battery E | 4.18 | 99.4 |
|  | Secondary battery F | 4.21 | 99.2 |
|  | Secondary battery G | 4.26 | 98.6 |
|  | Secondary battery H | 4.30 | 80.0 |

According to Table 2, the capacity maintaining factor of the secondary battery B is 99.4% that is higher than 99%, whereas the capacity maintaining factor of the secondary battery C is 90.0% that is greatly lower than that of the secondary battery B.

In the secondary battery C whose maximum inter-terminal voltage $V_m(-5)$ is 4.18 V higher than 4.12 V of the secondary battery B, large polarization is occurred in the negative electrode plate due to the charge by means of the high charging current within the low-temperature range $AT_l$ in the charge and discharge pulse cycle test. At this time, the electric potential of the negative electrode plate may occasionally be lower than the electric potential of the metallic lithium. For this reason, the metallic lithium is deposited on the negative electrode plate, and thus it is considered that the capacity of the secondary battery C is reduced after the charge and discharge pulse cycle test.

Therefore, in the secondary batteries 101 according to the first embodiment, at an initial stage where the internal resistance does not rise due to progress of deterioration, the maximum inter-terminal voltage is suitably set to 4.12 V Therefore, this value is used as the initial maximum inter-terminal voltage $V_{m0}(-5)$ of the secondary batteries 101 (secondary batteries A to H) at the battery temperature T of −5° C.

As described above, the internal resistance of the secondary battery A at various measuring periods were measured by the DC-IR method (see Table 1). A length of the measuring period, that is used for the calculation of the difference resistance $\Delta R(T_{ja})$ according to the formula $(V_m(T)=V_{m0}(T)+\Delta R(T_{ja})\times I_m(T))$ to be used at the maximum voltage calculating subroutine S30, is studied. The allowable charging currents $I_m(-5)$ of the secondary batteries A to C at the battery temperature T of −5° C. are 12 C (=70 A). According to this, the maximum inter-terminal voltage $V_m(-5)$ of the secondary battery A at −5° C. is calculated by using the difference resistance $\Delta R(T_{ja})$ of the secondary battery A at each time described in Table 1 and the formula $(V_m(T)=V_{m0}(T)+\Delta R(T_{ja})\times I_m(T))$ used at the maximum voltage calculating subroutine S30.

The initial maximum inter-terminal voltage $V_{m0}(-5)$ is 4.12 V as described above. As a result, the maximum inter-terminal voltage $V_m(-5)$ is 4.176 V at the measuring period of 0.1 seconds, 4.211 V at 1.0 second, 4.260 V at 10.0 seconds, and 4.302 V at 20.0 seconds (see Table 1).

Relatively fresh secondary batteries having the configuration similar to those of the secondary batteries B and C were prepared, and the accelerated deterioration test, that was conducted on the secondary battery A, was conducted on them so that five secondary batteries (the secondary batteries D to H) that were deteriorated more than the secondary batteries B and C were prepared. Similarly to the secondary batteries B and C, capacities of these secondary batteries D to H were measured.

After the measurement of the capacities, the secondary batteries D to H with the maximum inter-terminal voltage $V_m(-5)$ set as below were subjected to the charge and discharge pulse cycle test, as with the secondary batteries B and C. That is to say, the maximum inter-terminal voltages $V_m(-5)$ of the secondary battery D, the secondary battery E, the secondary battery F, the secondary battery G and the secondary battery H were set to 4.12 V, 4.18 V, 4.21 V, 4.26 V, and 4.30 V, respectively (see Table 2). Furthermore, as with the secondary batteries B and C, the charge and discharge pulse cycle test on the secondary batteries D to H was repeated 10 times. The accelerated deterioration test similar to the one conducted for the secondary battery A has been already conducted on the secondary batteries D to H, and thus it is considered that their internal resistances are approximately equal to the value of the secondary battery A after the test.

Further, after the charge and discharge pulse cycle test, the capacities of the secondary batteries D to H were measured again similarly to the method used before the charge/discharge pulse cycle test, and the capacity maintaining factors (%) of the secondary batteries D to H before and after the charge and discharge pulse cycle test were calculated as with the secondary batteries B and C. The calculated capacity maintaining factors (%) of the secondary batteries D to H are shown in Table 2.

According to Table 2, the capacity maintaining factor of the secondary battery D is 99.4%, the capacity maintaining factor of the secondary battery E is 99.4%, and the capacity maintaining factor of the secondary battery F is 99.2%. These capacity maintaining factors are high, 99% or more. On the contrary, the capacity maintaining factor of the secondary battery G is 98.6% that is slightly low, and the capacity maintaining factor of the secondary battery H is 80.0%, namely, this is greatly reduced. For this reason, in the secondary batteries E and F as well as the secondary battery D, namely, the secondary batteries whose maximum inter-terminal voltages are set by using the normal internal resistance measured with the measuring period being set to 1.0 or less second, even when the charge and discharge pulse cycle test is conducted, high capacities can be maintained (maintaining factor of 99% or higher). When the internal resistances of the secondary batteries are measured by the DC-IR method, the measuring period is shortened and a contribution of the diffusion resistances included in the normal internal resistances is made to be sufficiently small, so that the internal resistance can obtain small values. For this reason, when the maximum inter-terminal voltage to be calculated is suppressed to a comparatively small value, the large charging current Ic flows in the secondary batteries 101 (the secondary batteries D E and F). Even if polarization is occurred in the negative electrode plate 130, the electric potential of the negative electrode plate becomes lower than that of the metallic lithium, and the deposition of the metallic lithium can be suppressed.

In the battery control system BS1 according to the first embodiment, since the predetermined time TM1 between the first time P1 and the second time P2 corresponding to the measuring period is set to 1.0 second or less (concretely, 0.1 seconds), the normal internal resistance $R_j(T_{ja})$ in which a ratio of the diffusion resistance is sufficiently small can be obtained at the resistance obtaining subroutine S40. Therefore, when the charge is carried out by a large electric current, while the deposition of the metallic lithium on the negative electrode plate 130 of the secondary battery 101 (101A) is being suppressed, the secondary battery 101 (101A) can be charged suitably to the high inter-terminal voltage.

In addition, when the predetermined time TM1 is set to 0.1 seconds or shorter, the ratio of the diffusion resistance included in the obtained (calculated) normal internal resistance $R_j(T_{ja})$ can further be reduced. Therefore, in the battery control system BS1, since the predetermined time TM1 for which the charging current Ic is applied is set to 0.1 seconds, when the charge is carried out by a large electric current, while the deposition of the metallic lithium on the negative electrode plate 130 of the secondary battery 101 (101A) is being securely supressed, the secondary battery 101 (101A) can be charged to the suitable inter-terminal voltage.

Modified Example 1

A first modified example of the present invention will be described below with reference to drawings. In a battery control system BS2 according to the first modified example, at the main routine M1, different points from the first embodiment are such that cycle time TC2 is set to 0.02 seconds that is shorter than the cycle time TCM (0.1 seconds) of the first embodiment, and steps S13, S14 and S18 shown by broken lines in FIG. 4 are added. Therefore, the points that are different from the first embodiment are mainly described, and the description about the portions similar to the first embodiment will be omitted or simplified. The portions similar to the first embodiment provide the same operations and effects as those in the first embodiment. Further, like components or parts will be described with the same reference signs as those in the first embodiment.

As to the battery control system BS2, the steps S11 to S20 in the main routine M1 shown in FIG. 4 including the steps absent in the first embodiment will be described and other parts will be omitted.

Concretely, similarly to the first embodiment, a determination is made at step S11 whether the battery temperature T obtained at step S2 in this cycle is equal to the first time battery temperature T1 stored at step S9 or not. When NO, namely, when the battery temperature T at this cycle is different from the first time battery temperature T1, the sequence goes to step S17. On the other hand, when YES, namely, when the battery temperature T is equal to the first time battery temperature T1, the sequence goes to step S12.

Similarly to first embodiment, it is determined at step S12 whether the current value IF measured at step S2 at this cycle is equal to the first time current value IF1 stored at step S9 or not. When NO, namely, when the current value IF at this cycle is different from the first time current value IF1, the sequence goes to step S17. On the other hand, when YES, namely, when the current value IF is equal to the inverted current value IF1, the sequence goes to step S13 shown by a broken line in FIG. 4.

At step S13, after the inversion flag F1 is set, "m" representing the number of times of passing through step S12 is incremented by 1 (m=m+1). At step S14, a determination is made whether the number m is smaller than 6. When YES, namely, the number m is smaller than 6 (m<6), the sequence goes to step S19. This is because the predetermined time TM1 (0.1 seconds that is similar to the first embodiment) does not pass immediately after the operation of the secondary battery 101A is inverted from discharging to charging. On the other hand, when NO, namely, when the number m is 6 (m=6), for the predetermined time TM1 of 0.1 seconds from the first time P1 immediately after the operation of the secondary battery 101A is inverted from discharging to charging, the current values IF, that are detected six times with the battery temperature T being maintained at the first time battery temperature T1, are equal to the first time current value IF1. Therefore, the sequence goes to the resistance obtaining subroutine at step S40.

At the resistance obtaining subroutine S40, as in the first embodiment, the normal internal resistance $R_j(T_{ja})$ of the secondary battery 101A at the first battery temperature $T_{ja}$ (20° C.) is obtained. Therefore, also in this first modified example, as in the first embodiment, the normal internal resistance $R_j(T_{ja})$ of the secondary battery 101A at the first battery temperature $T_{ja}$ is obtained based on the change (the difference voltage $\Delta V(T_{ja})$) in the inter-terminal voltage occurred in the secondary battery 101A for the predetermined time TM1 (0.1 seconds) and the current value IF (the first time current value IF1).

Thereafter, as in the first embodiment, a determination is made at step S15 whether the normal internal resistance $R_j(T_{ja})$ is newly obtained (updated) at the resistance obtaining subroutine S40 or not. When NO, the sequence goes to step S17. On the other hand, when YES, the sequence goes to step S16.

Similarly to the first embodiment, at step S16, the difference resistance $\Delta R(T_{ja})$ of the secondary battery 101A at the time when the battery temperature T is the first battery temperature $T_{ja}$ is obtained. Further, at step S17, the inversion flag F1 is reset and the sequence goes to step S18 shown by a broken line as in the first embodiment.

At step S18, the number m is reset (m=0), and the sequence goes to step S19. This is because, until the predetermined time TM1 (0.1 seconds) passes just after the operation of the secondary battery 101A is inverted from discharge to charge, when the current value IF is different from the inverted current value IF1, or the battery temperature T is changed from the first battery temperature $T_{ja}$, or the resistance obtaining subroutine S40 is executed, the number of times m is cleared.

In the battery control system BS2 according to the first modified example, the current values IF of a plurality of the charging currents Ic obtained at a period up to the time when the predetermined time TM1 (0.1 seconds) passes immediately after the operation of the secondary battery 101A is inverted from discharging to charging are equal to each other, the normal internal resistance $R_j(T_{ja})$ is obtained at the resistance obtaining subroutine S30. For this reason, an error due to a fluctuation in an electric current is suppressed, and more accurate normal internal resistance $R_j(T_{ja})$ of the secondary batteries 101 can be obtained.

Second Embodiment

A second embodiment of the present invention will be described below with reference to drawings. In the first embodiment and the first modified example, the normal internal resistance $R_j(T_{ja})$ is measured by the battery control systems itself, but a battery control system BS3 according to the second embodiment is different from the above-described first embodiment in that a normal internal resistance storage unit for storing externally input normal internal resistance $R_j(T_{ja})$ of the secondary batteries 101 at the time of input is provided. That is to say, the HV control device 20 of the battery control system BS3 according to the second modified example is configured so that the normal internal resistance $R_j(T_{ja})$ of the secondary batteries 101 externally input can be stored in the microcomputer 21.

Figure 9:
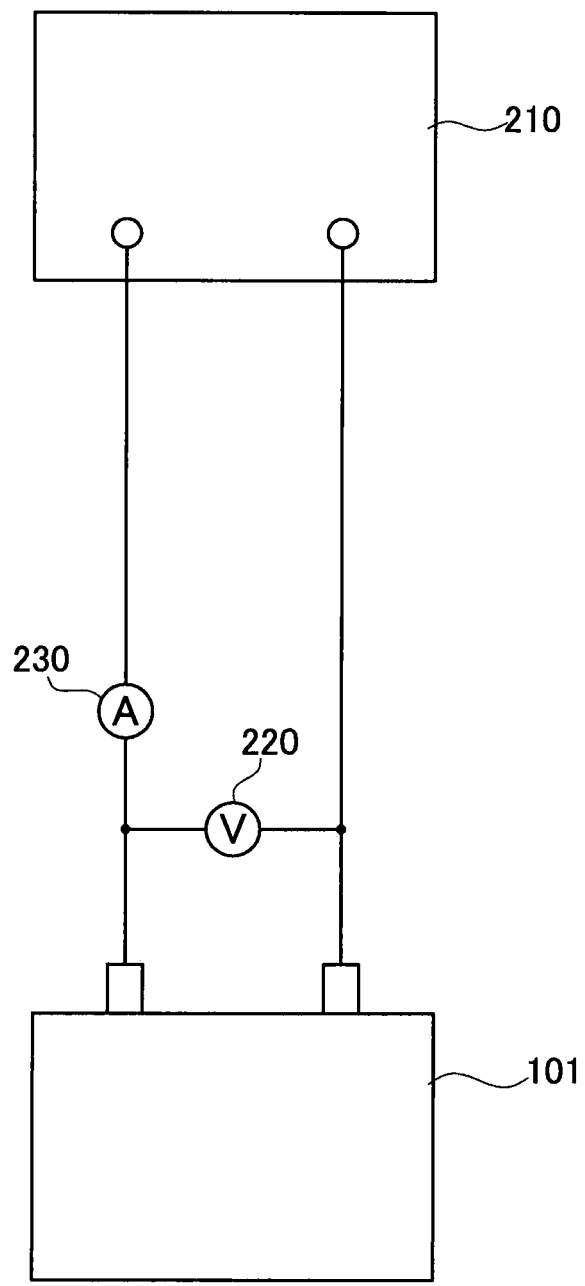
FIG. 9 is a diagram to explain the second embodiment.

Further, the measurement of the normal internal resistance $R_j(T_{ja})$ is taken concretely as follows. The secondary batteries 101 are temporarily demounted from the vehicle 1 (the battery control system BS3) at a timing of safety inspection of the vehicle or the like. The normal internal resistance $R_j(T_{ja})$ of the secondary batteries 101 is measured according to the DC-IR method by using a DC power supply apparatus 210, a voltmeter 220 and an ammeter 230 installed outside the battery control system BS3 (see FIG. 9). At this time, the secondary batteries 101 are measured under an environment of the first battery temperature $T_{ja}$ (20° C.).

Thereafter, the secondary batteries 101 are mounted back in the vehicle 1, and the obtained normal internal resistance $R_j(T_{ja})$ of the secondary batteries 101 at the first battery temperature $T_{ja}$ (20° C.) is input (written) into the RAM (not shown) of the microcomputer 21 by a known method. As a result, thereafter, in the battery control system BS3, the normal internal resistance $R_j(T_{ja})$ of the secondary batteries 101 is used in the vehicle 1 to set the maximum inter-terminal voltage $V_m(T)$ of the secondary batteries 101.

In the battery control system BS3 according to the second embodiment, even when the resistance obtaining unit is not provided in the battery control system BS3, the deposition of metallic lithium on the negative electrode plate 130 of the secondary battery 101 is securely suppressed by using the normal internal resistance $R_j(T_{ja})$, and simultaneously the secondary batteries 101 can be charged suitably to a high inter-terminal voltage.

The present invention is described above along the first and second embodiments and the first modified example, but the present invention is not limited to the above embodiments and can be modified variously without departing from the scope of the invention.

For example, the first embodiment and others use the negative electrode plate including natural graphite as the negative active material. As an alternative, a negative electrode plate including graphite other than natural graphite or artificial graphite as the negative active material may be used. Further, the embodiments illustrate an example where, only the initial internal resistance $R_0(T)$ relating to the predetermined battery temperature $T_{ja}$ within the normal temperature range $AT_j$ is stored in the resistance storage unit. However, for example, the entire normal temperature range $AT_j$ and the entire temperature range including the low-temperature range $AT_l$ may be stored for each battery temperature T. Further, in the second embodiment, the normal internal resistance $R_j(T_{ja})$ is measured by using the DC-IR method, but may be measured by using an AC impedance (AC-IR) method.

The invention claimed is:

1. A battery control system including a lithium-ion secondary battery having a positive electrode plate and a negative electrode plate, and a control device for setting an allowable maximum inter-terminal voltage and an allowable charging current at the time of charging of the secondary battery and controlling the charging from a power supply to the secondary battery, wherein when a normal temperature range $AT_j$ of a battery temperature T is set to 20 to 45° C. and a low-temperature range $AT_l$ of a battery temperature T is set to −30 to 0° C., the negative electrode plate has a characteristic such that when characteristics of the negative electrode plate are compared in cases where the battery temperature T is within the normal temperature range $AT_j$ and within the low-temperature range $AT_l$, reaction resistance $R_r(T)$ caused in the negative electrode plate is higher in the low-temperature range $AT_l$, and a ratio of the reaction resistance $R_r(T)$ of the negative electrode plate in internal resistance $R(T)$ of the secondary battery is larger in the low-temperature range $AT_l$, wherein the battery control system includes:

a voltage storage unit for storing an initial maximum inter-terminal voltage $V_{m0}(T)$ allowed at an early use of the secondary battery in the maximum inter-terminal voltage $V_m(T)$ for each battery temperature T;

a resistance storage unit for storing initial internal resistance $R_0(T)$ caused at the early use of the secondary battery at least at a predetermined battery temperature $T_{ja}$ within the normal temperature range $AT_j$;

an electric current storage unit for storing the allowable charging current $I_m(T)$ for each battery temperature T;

a difference obtaining unit for obtaining difference resistance $\Delta R(T_{ja})$ as a difference between normal internal resistance $R_j(T_{ja})$ at the predetermined battery temperature $T_{ja}$ within the normal temperature range $At_j$ in the internal resistance of the secondary battery at timing when the battery temperature T of the secondary battery becomes the predetermined battery temperature $T_{ja}$ and the corresponding initial internal resistance $R_0(T_{ja})$ at the predetermined battery temperature $T_{ja}$ stored in the resistance storage unit; and a maximum voltage calculating unit for, at least when the battery temperature T is within the low-temperature range $AT_l$, setting the maximum inter-terminal voltage $V_m(T)$ corresponding to the battery temperature T to a value obtained by adding a product of the difference resistance $\Delta R(T_{ja})$ and the allowable charging current $I_m(T)$ stored in the electric current storage unit to the initial maximum inter-terminal voltage $V_{m0}(T)$ stored in the voltage storage unit.

2. The battery control system according to claim 1, wherein the negative electrode plate has a characteristic such that, as to the reaction resistance $R_r(T)$, the low-temperature reaction resistance $R_{rl}(T_l)$ at the temperature $T_l$ within the low-temperature range $AT_l$ obtains a value that is 7 or more times as large as the normal reaction resistance $R_{rj}(T_j)$ at the temperature $T_j$ within the normal temperature range $AT_j$, a ratio $R_{rj}(T_j)/R_j(T_j)$ of the normal reaction resistance $R_{rj}(T_j)$ in the normal internal resistance $R_j(T_j)$ that is the internal resistance $R(T)$ at the temperature $T_j$ is 10% or less, and a ratio $R_{rl}(T_l)/R_l(T_l)$ of the low-temperature reaction resistance $R_{rl}(T_l)$ in the low-temperature internal resistance $R_l(T_l)$ that is the internal resistance $R(T)$ at the temperature $T_l$ is 20% or more.

3. The battery control system according to claim 2, wherein when the battery temperature T is higher than the low-temperature range $AT_l$, the maximum voltage calculating unit sets the initial maximum inter-terminal voltage $V_{m0}(T)$ to be a value of the maximum inter-terminal voltage $V_m(T)$.

4. The battery control system according to claim 3, comprising a normal internal resistance storage unit for storing the normal internal resistance $R_j(T_{ja})$ of the secondary battery at the input time, which is externally input.

5. The battery control system according to claim 2, comprising a resistance obtaining unit for obtaining the normal internal resistance $R_j(T_{ja})$ of the secondary battery when the battery temperature T of the secondary battery is the predetermined battery temperature $T_{ja}$.

6. The battery control system according to claim 5, comprising:

a charging state detecting unit for detecting a charging state of the secondary battery;

an open inter-terminal voltage storage unit for storing an open inter-terminal voltage at each charging state of the secondary battery in advance; and an open inter-terminal voltage obtaining unit for obtaining the open inter-terminal voltage based on the charging states detected by the charging state detecting unit, wherein the resistance obtaining unit is a means for, when the same level of charging currents are detected until a second time after a predetermined time passes from a first time just after an operation of the secondary battery is changed from discharging to charging in a charging period of the secondary battery, obtaining the normal internal resistance $R_j(T_{ja})$ by using a difference between the open inter-terminal voltage corresponding to the charging state of the secondary battery at the first time and the inter-terminal voltage of the secondary battery at the second time, and a current value of the charging current, and the predetermined time is 1.0 second or less.

7. The battery control system according to claim 6, wherein the predetermined time in the resistance obtaining unit is 0.1 seconds or less.

8. The battery control system according to claim 2, comprising a normal internal resistance storage unit for storing the normal internal resistance $R_j(T_{ja})$ of the secondary battery at the input time, which is externally input.

9. The battery control system according to claim 1, wherein when the battery temperature T is higher than the low-temperature range $AT_l$, the maximum voltage calculating unit sets the initial maximum inter-terminal voltage $V_{m0}(T)$ to be a value of the maximum inter-terminal voltage $V_m(T)$.

10. The battery control system according to claim 9, comprising a resistance obtaining unit for obtaining the normal internal resistance $R_j(T_{ja})$ of the secondary battery when the battery temperature T of the secondary battery is the predetermined battery temperature $T_{ja}$.

11. The battery control system according to claim 10, comprising:
a charging state detecting unit for detecting a charging state of the secondary battery;
an open inter-terminal voltage storage unit for storing an open inter-terminal voltage at each charging state of the secondary battery in advance; and
an open inter-terminal voltage obtaining unit for obtaining the open inter-terminal voltage based on the charging states detected by the charging state detecting unit,
wherein the resistance obtaining unit is a means for, when the same level of charging currents are detected until a second time after a predetermined time passes from a first time just after an operation of the secondary battery is changed from discharging to charging in a charging period of the secondary battery, obtaining the normal internal resistance $R_j(T_{ja})$ by using a difference between the open inter-terminal voltage corresponding to the charging state of the secondary battery at the first time and the inter-terminal voltage of the secondary battery at the second time, and a current value of the charging current, and the predetermined time is 1.0 second or less.

12. The battery control system according to claim 11, wherein the predetermined time in the resistance obtaining unit is 0.1 seconds or less.

13. The battery control system according to claim 9, comprising a normal internal resistance storage unit for storing the normal internal resistance $R_j(T_{ja})$ of the secondary battery at the input time, which is externally input.

14. The battery control system according to claim 1, comprising a resistance obtaining unit for obtaining the normal internal resistance $R_j(T_{ja})$ of the secondary battery when the battery temperature T of the secondary battery is the predetermined battery temperature $T_{ja}$.

15. The battery control system according to claim 14, comprising:
a charging state detecting unit for detecting a charging state of the secondary battery;
an open inter-terminal voltage storage unit for storing an open inter-terminal voltage at each charging state of the secondary battery in advance; and
an open inter-terminal voltage obtaining unit for obtaining the open inter-terminal voltage based on the charging states detected by the charging state detecting unit,
wherein the resistance obtaining unit is a means for, when the same level of charging currents are detected until a second time after a predetermined time passes from a first time just after an operation of the secondary battery is changed from discharging to charging in a charging period of the secondary battery, obtaining the normal internal resistance $R_j(T_{ja})$ by using a difference between the open inter-terminal voltage corresponding to the charging state of the secondary battery at the first time and the inter-terminal voltage of the secondary battery at the second time, and a current value of the charging current, and the predetermined time is 1.0 second or less.

16. The battery control system according to claim 15, wherein the predetermined time in the resistance obtaining unit is 0.1 seconds or less.

17. The battery control system according to claim 14, comprising a resistance obtaining unit for obtaining the normal internal resistance $R_j(T_{ja})$ of the secondary battery when the battery temperature T of the secondary battery is the predetermined battery temperature $T_{ja}$.

18. The battery control system according to claim 17, comprising:
a charging state detecting unit for detecting a charging state of the secondary battery;
an open inter-terminal voltage storage unit for storing an open inter-terminal voltage at each charging state of the secondary battery in advance; and
an open inter-terminal voltage obtaining unit for obtaining the open inter-terminal voltage based on the charging states detected by the charging state detecting unit,
wherein the resistance obtaining unit is a means for, when the same level of charging currents are detected until a second time after a predetermined time passes from a first time just after an operation of the secondary battery is changed from discharging to charging in a charging period of the secondary battery, obtaining the normal internal resistance $R_j(T_{ja})$ by using a difference between the open inter-terminal voltage corresponding to the charging state of the secondary battery at the first time and the inter-terminal voltage of the secondary battery at the second time, and a current value of the charging current, and the predetermined time is 1.0 second or less.

19. The battery control system according to claim 18, wherein the predetermined time in the resistance obtaining unit is 0.1 seconds or less.

20. The battery control system according to claim 1, comprising a normal internal resistance storage unit for storing the normal internal resistance $R_j(T_{ja})$ of the secondary battery at the input time, which is externally input.

* * * * *